(12) United States Patent
Pretorius

(10) Patent No.: US 11,665,323 B2
(45) Date of Patent: May 30, 2023

(54) PROJECTION SYSTEM

(71) Applicant: Carl Zeiss Jena GmbH, Jena (DE)

(72) Inventor: Marco Pretorius, Oberkochen (DE)

(73) Assignee: Carl Zeiss Jena GmbH, Jena (DE)

( * ) Notice: Subject to any disclaimer, the term of this patent is extended or adjusted under 35 U.S.C. 154(b) by 0 days.

(21) Appl. No.: 17/487,271

(22) Filed: Sep. 28, 2021

(65) Prior Publication Data

US 2022/0103791 A1 Mar. 31, 2022

(30) Foreign Application Priority Data

Sep. 30, 2020 (DE) ......................... 102020125572.1

(51) Int. Cl.
*H04N 9/31* (2006.01)
*G03B 21/00* (2006.01)
*G03B 21/28* (2006.01)

(52) U.S. Cl.
CPC ......... *H04N 9/3126* (2013.01); *G03B 21/005* (2013.01); *G03B 21/28* (2013.01)

(58) Field of Classification Search
CPC .... G03B 21/005; G03B 21/006; G03B 21/28; G03B 21/206; G03B 21/208; G03B 21/2053; G03B 21/2066; H04N 9/315; H04N 9/3102; H04N 9/3105; H04N 9/3111; H04N 9/3126; H04N 9/3144; H04N 9/3152; G02B 17/0852; G02B 17/0856; G02B 17/0864; G02B 17/0888
See application file for complete search history.

(56) References Cited

U.S. PATENT DOCUMENTS

| | | | | |
|---|---|---|---|---|
| 11,048,153 | B2* | 6/2021 | Yamada | G03B 21/147 |
| 2011/0176120 | A1 | 7/2011 | Geissler et al. | |
| 2013/0242274 | A1 | 9/2013 | Geissler et al. | |
| 2014/0085615 | A1 | 3/2014 | Pretorius et al. | |
| 2014/0146295 | A1* | 5/2014 | Tatsuno | G03B 21/28 353/98 |
| 2015/0124337 | A1* | 5/2015 | Ito | G02B 13/22 359/733 |
| 2016/0191880 | A1* | 6/2016 | Shields | H04N 9/3123 348/615 |
| 2019/0285979 | A1* | 9/2019 | Takano | G02B 13/16 |

FOREIGN PATENT DOCUMENTS

DE            10140806 A1    3/2003

* cited by examiner

*Primary Examiner* — Sultan Chowdhury
(74) *Attorney, Agent, or Firm* — Skaar Ulbrich Macari, P.A.

(57) ABSTRACT

A projection system can include a first modulator including a plurality of pixels in a first modulator surface, a second modulator including a plurality of pixels in a second modulator surface, and an intermediate imaging optical unit, which images the first modulator surface onto the second modulator surface, wherein the intermediate imaging optical unit includes a first lens having a convex side and wherein the convex side of the first lens is a free-form surface, which is not spherical and not rotationally symmetric and does not exhibit any mirror symmetry.

19 Claims, 17 Drawing Sheets

PROJECTION SYSTEM

PRIORITY

This application claims the benefit of German Patent Application No. 102020125572.1, filed Sep. 30, 2020, which is hereby incorporated herein by reference in its entirety.

FIELD

The present invention relates to a projection system.

BACKGROUND

In a projection system, such as disclosed in DE 10 2008 029 789 A1 for example, the optical series connection of two tilting mirror matrices provides the advantage that the blacklight level in the projected image (that is to say the remaining brightness of an image point that is black per se) can be significantly reduced in comparison with projection systems having only one tilting mirror matrix.

At its core, the optical solution in the projection system of DE 10 2008 029 789 A1 is to image the two tilting mirror matrices onto one another by means of a plane-prism group, a planoconvex lens with a meridionally symmetric free-form surface, and a meniscus lens that has been made reflective on its rear side at an imaging scale of 1:1 in a pixel-accurate manner, i.e. with the lowest distortion.

If the aim is to use such an arrangement with significantly larger imagers or modulators, such as tilting mirror matrices, the size of the prisms and the distance between the midpoints of the imagers in the unfolded beam path likewise increase proportionally. Since the assumption in DE 10 2008 029 789 A1 is that the two tilting mirror matrices are part of a common object and image plane of a monocentric imaging optical unit, this is equivalent to the object/image field of said optical unit likewise increasing proportionally to the size of the imagers. However, for larger object fields, a higher-order distortion very abruptly limits the pixel accuracy of the 1:1 imaging and therefore disturbs the contrast-increasing effect of the double modulation. For a system that is designed in accordance with the prior art, the only path to solving this problem (desired 4K resolution and thus the necessary use of significantly larger tilting mirror matrices with edge lengths of 31 mm×16.4 mm) is to also scale all remaining distances of the intermediate imaging system proportionally with the size of the tilting mirror matrices, with the result that a structural size of the entire optical unit of more than 650 mm would be obtained. Without this scaling, the distortion for the tilting mirrors of the tilting mirror matrices that are located the furthest away from the plane of symmetry would result in a distortion that is greater than the distance between two adjacent tilting mirrors (pixels), as a result of which the pixel-accurate assignment would be lost.

SUMMARY

It is an object herein to provide a compact optical setup, with simultaneous good imaging quality, which can be realized even if the modulators comprise relatively large modulator surfaces.

The convex side of the first lens of the intermediate imaging optical unit can be formed as a free-form surface that is not spherical and not rotationally symmetric and that does not exhibit any mirror symmetry. Consequently, the free-form surface can be referred to as a non-meridionally symmetric free-form surface and as a non-sagittally symmetric free-form surface.

With this solution, it is possible for example to maintain approximately the original structural size (with smaller modulators) and yet enable largely pixel-accurate imaging. The two modulators are no longer interpreted as sections of a common object or image plane of a monocentric optical unit, and in particular the meridional symmetry, i.e. the mirror symmetry about the plane extending perpendicularly to the straight connecting line of the midpoints of the modulators through the center thereof, is dispensed with.

The convex surface of the first lens (which, in the prior known projection systems according to DE 10 2008 029 789 A1, was embodied as a meridionally symmetric free-form surface) can be described by a generalized free-form surface that also uses odd expansion terms in the x-coordinate (wherein the x-coordinate axis is oriented parallel to the straight connecting line of the two midpoints of the modulators). The following general formula for describing a free-form surface $$z = \frac{(x^2+y^2)/R}{1+\sqrt{1-(1+k)\cdot\frac{(x^2+y^2)}{R^2}}} + \sum_{m,n=1}^{\infty} C_{m,n} \frac{1}{N_{Radius}^{n+m}} x^m y^n$$

thus, according to the disclosure, also contains odd powers in x. The additionally obtained degrees of freedom in particular permit a significantly better correction of the distortion, but also an additional improvement in the imaging quality (wavefront errors) with respect to an intermediate imaging optical unit designed meridionally symmetrically according to DE 10 2008 029 789 A1.

The first lens can in particular be embodied in the form of a planoconvex lens.

The intermediate imaging optical unit can furthermore comprise a lens that has been made reflective on the rear side (in particular a concave-convex lens, whose convex side has been made reflective).

In the projection system in certain embodiments, the deviation of the convex side of the first lens from a mirror-symmetric embodiment can be defined with reference to the y-z-plane of a right-handed Cartesian coordinate system. In this case, the x-axis of the right-handed Cartesian coordinate system coincides with an imaginary straight connecting line connecting a midpoint of the first modulator surface and a midpoint of the image of the first modulator surface that is imaged by the intermediate imaging optical unit. In the unfolded state of any planar reflection surfaces of all the optical elements, the z-axis is located in the beam path between the two modulators (that means in particular that, in this view, no beam path folding is present at planar reflective surfaces because the unfolded state is viewed) perpendicularly to a reference plane in which the first modulator surface is located, and splits the imaginary straight connecting line as a mid-perpendicular into two portions of equal length. The deviation of the convex side can then be defined as a maximum value of the respective absolute value of differences of the z-values of the convex side of in each case two points on the convex side of the first lens that are located symmetrically with respect to the y-z-plane, wherein the deviation of the convex side of the first lens from a mirror-symmetric embodiment with respect to the y-z-plane of the right-handed Cartesian coordinate system is designed such that the maximum value is greater than or equal to 1 µm and smaller than or equal to 100 µm. The maximum value can also be greater than or equal to 3 µm and smaller than or equal to 20 µm.

Furthermore, the intermediate imaging optical unit can be designed such that the ratio of half the diameter of an imaginary smallest circle surrounding the complete first modulator surface and the entire image of the first modulator surface that is imaged by the intermediate imaging optical unit to the maximum extent of an imaginary smallest cuboid enclosing the optically used regions of all the optical elements between the two modulators, including the two modulators, is greater than or equal to 0.06 and smaller than or equal to 0.25. With preference, the ratio can be smaller than or equal to 0.20; 0.19; 0.18; 0.17; 0.16; 0.15; 0.14; 0.13 or 0.12. Furthermore, the ratio can be greater than or equal to 0.07; 0.08; 0.09; 0.10; 0.11; 0.12; 0.13; 0.14 or 0.15.

The intermediate imaging optical unit can be designed such that it brings about imaging of the first modulator surface onto the second modulator surface if the first and second modulator surfaces are each a rectangular surface of at least 31 mm×16.4 mm.

In particular, the intermediate imaging optical unit may be in the form of a 1:1 imaging optical unit. Furthermore, the intermediate imaging optical unit can comprise a distortion correction, in which the remaining distortion error is smaller than 5 µm or smaller than a maximum extent of a pixel of the first or second modulator.

The maximum extent of an imaginary smallest cuboid enclosing the optically used regions of all the optical elements between the two modulators and the two modulators themselves can be smaller than or equal to 500 mm.

The first and second lenses can be made from the same material.

A deflection optical unit can be arranged between the modulators on one side and the intermediate imaging optical unit on the other side. The deflection optical unit can be embodied such that at least one beam path folding between the first modulator and the intermediate imaging optical unit is effected (e.g. by way of total internal reflection). The deflection optical unit can furthermore be embodied such that at least one beam path folding between the second modulator and the intermediate imaging optical unit is effected (e.g. by way of total internal reflection).

In particular, the deflection optical unit can fold the beam path between the intermediate imaging optical unit and each modulator in each case twice.

The first lens and the deflection optical unit can be made from the same material. The intermediate imaging optical unit can comprise an aperture stop, which encloses with the normal of the modulator surface of the first modulator, without taking into account any beam path folding, an angle of not equal to 90° and/or is decentered in the y-direction. This is advantageous in particular if tilting mirror matrices are used as the modulators, because the beams can thus be limited to the cones extending (owing to the tilting angles of the tilting mirror matrices) in a tilted fashion with respect to the modulator surface. In this way, better extraneous-light suppression is possible.

Beam path folding is here understood to mean any beam path folding that does not exhibit any imaging property. In other words, this involves beam path folding at planar (preferably reflective) surfaces. Such beam path folding serves for increasing the compactness of the apparatus but does not influence the imaging quality of the intermediate imaging optical unit, which means that the tilting of the aperture stop is in reference to the modulator surface without any beam path folding (and thus with an unfolded optical unit located between the first modulator and the aperture stop).

The first and second modulators can each be embodied in the form of a two-dimensional modulator, which is reflective or transmissive. The pixels can be arranged in rows and columns. For example, the first and second modulators can be embodied in the form of LCD modulators, LCoS modulators, or tilting mirror matrices. Furthermore, the first and second modulators are preferably embodied identically.

Each tilting mirror matrix comprises a plurality of tilting mirrors whose tilting axes lie in a modulator surface. If the projection system is to provide a 4 k resolution, the tilting mirror matrices can each comprise 3840×2160 tilting mirrors. The modulator surface area can then be 31 mm×16.4 mm.

In the projection system according to certain embodiments, the modulator surface of the first tilting mirror matrix can be arranged in a modulator plane, and the modulator surface of the second tilting mirror matrix can be arranged in the modulator plane or in a plane that is parallel thereto, and a deflection optical unit, which folds the beam path between the intermediate imaging optical unit and the respective tilting mirror matrix at least once, can be arranged between the tilting mirror matrices on one side and the intermediate imaging optical unit on the other side.

Using this deflection optical unit, a compact embodiment of the projection system can be ensured. In particular, there is enough space for the necessary drive electronics of the tilting mirror matrices, which means that the driving electronics do not project into the region of the intermediate imaging optical units that is required for imaging.

Furthermore, the two tilting mirror matrices can be arranged such that the first modulator surface of the first tilting mirror matrix lies in a first plane and the second modulator surface of the second tilting mirror matrix lies in a second plane, wherein the first and second planes are tilted with respect to one another such that they neither extend parallel to one another nor do they coincide. The tilting angle is thus greater than 0° and preferably smaller than 5°, smaller than 4°, smaller than 3°, smaller than 2° or smaller than 1°. In this way, a further degree of freedom is present that can be used to optimize the imaging quality. In particular, it can be used for calibrating the distortion.

The modulators (in particular the tilting mirror matrices) can each comprise a rectangular modulator surface in which the pixels are arranged. In the unfolded state of the deflection optical unit, the modulators can be arranged in the x-y-plane in particular such that one side of the rectangular modulator surface encloses with the y-axis an angle from the range from 10° to 45°. The angles are preferably the same for both modulator surfaces, which means that the corresponding sides of the two modulator surfaces are parallel to one another.

In particular, the intermediate imaging optical unit may comprise only the planoconvex lens and the lens that has been made reflective on its rear side.

The lens that has been made reflective on its rear side preferably comprises only spherical interfaces.

In the protection system according to certain embodiments, an illumination module can be provided, which illuminates the first tilting mirror matrix with light in a manner such that the light impingement is perpendicular to the modulator surface of the first tilting mirror matrix, and the intermediate imaging optical unit can image the light, which is reflected by the tilting mirrors of the first tilting mirror matrix that are in the first tilted position, onto the second tilting mirror matrix at such an angle that the light reflected by the tilting mirrors of the second tilting mirror matrix that are in the first tilted position travels perpendicularly to the modulator surface of the second tilting mirror matrix.

In this way, the angles specified by the tilted positions are optimally utilized. In particular, it is easier to adjust the intermediate imaging optical unit. A projection optical unit arranged downstream of the second tilting mirror matrix can also be adjusted more easily because the light reflected by the tilting mirrors that are in the first tilted position travels perpendicularly to the modulator surface of the second tilting mirror matrix.

The illumination module can be used to ensure light of different colors (e.g. red, green and blue) impinges, for example, in a time sequential manner on the first tilting mirror matrix. The change between the colors is preferably realized to be so fast that a viewer cannot differentiate between the time-sequentially generated red, green and blue images, but rather only perceives the superposition as a multicolored projection.

The projection system can comprise a projection optical unit with which the light, which is coming from the second tilting mirror matrix and is to be projected, is or can be projected onto a projection surface.

The projection system according to certain embodiments can be embodied in particular in the form of a projector for applications in which the image to be projected is projected onto a planar projection surface or onto a curved projection surface. The curved projection surface can be, for example, part of a planetarium dome or part of a simulator (e.g. for planes, helicopters, cars, lorries, motorcycles, other vehicles, etc.). If the projection takes place in the dark, the black level reduction achieved is associated with a significant image improvement.

The projection system can furthermore be embodied in the form of a projector for front projection or as a projector for rear projection. The projection surface may be a constituent part of the projector.

The intermediate imaging optical unit and/or the deflection optical unit may use a single material for the material through which the light travels. For example, the lenses of the intermediate imaging optical unit and the deflection prisms of the deflection optical unit can be produced from the same material.

The intermediate imaging optical unit can be designed in particular for the visible wavelength range (400 to 750 nm). Furthermore, the intermediate imaging optical unit can be designed for the visible wavelength range up to the near infrared (400 nm-1500 nm).

Furthermore, the projection system can also comprise further parts or modules known to a person skilled in the art so that the desired image can be projected.

It is understood that the features mentioned above and the features still to be explained below can be used not only in the specified combinations but also in other combinations or on their own without departing from the scope of the present invention.

The invention will be explained in even more detail below on the basis of exemplary embodiments, with reference being made to the appended drawings, which likewise disclose features essential to the invention. These exemplary embodiments are only illustrative and should not be construed as restrictive. For example, a description of an exemplary embodiment with a multiplicity of elements or components should not be construed as meaning that all of these elements or components are necessary for implementation. Rather, other exemplary embodiments can also contain alternative elements and components, fewer elements or components, or additional elements or components.

Elements or components of different exemplary embodiments can be combined with one another, unless stated otherwise. Modifications and variations which are described for one of the exemplary embodiments can also be applicable to other exemplary embodiments. In order to avoid repetition, the same elements or corresponding elements in different figures are denoted by the same reference signs and are not explained a number of times.

DETAILED DESCRIPTION

Figure 1:
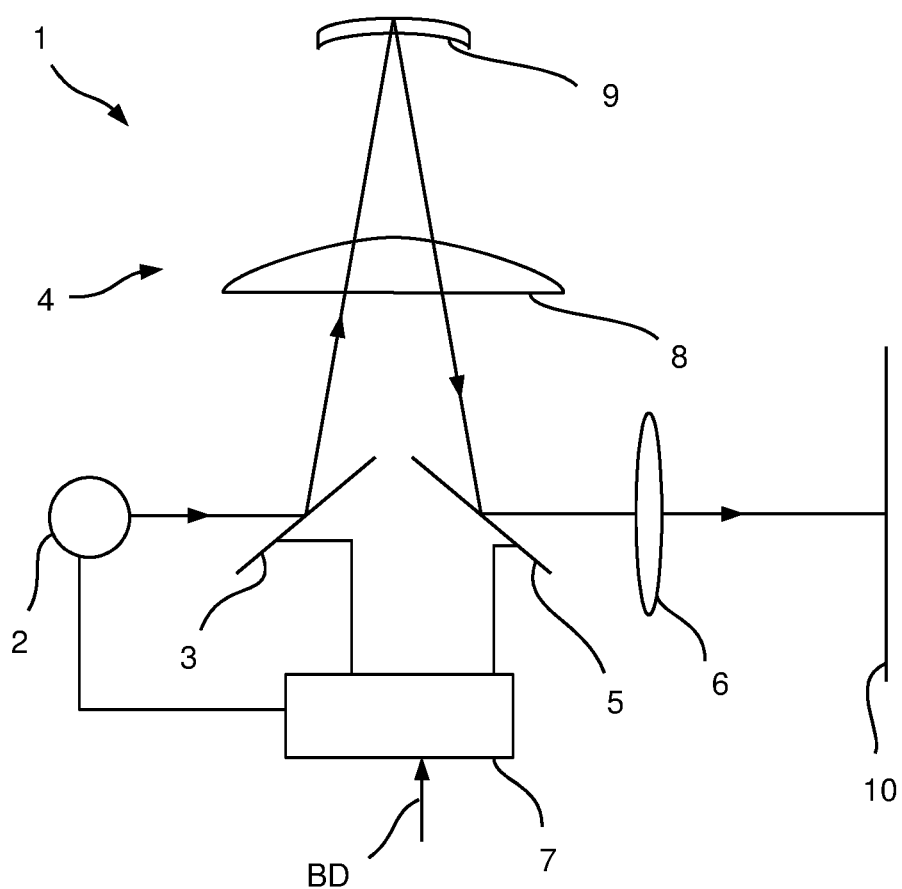
FIG. 1 shows a schematic view of one embodiment of the projector according to certain embodiments of the invention.

In the embodiment shown schematically in FIG. 1, the projector 1 according to the invention for projecting an image comprises a light source 2, an illumination modulator 3, an intermediate imaging optical unit 4, an image modulator 5, a projection optical unit 6, and also a control unit 7.

The two modulators 3, 5 are each embodied as a tilting mirror matrix comprising n×m tilting mirrors arranged in columns and rows, wherein the tilting mirrors can be brought into a first and a second tilted position independently of one another.

The intermediate imaging optical unit 4 is embodied in the form of a 1:1 imaging optical unit having a first lens 8, which comprises a convex side (here a planoconvex lens 8), and a second lens 9, which has been made reflective on the rear side, and images each tilting mirror of the illumination modulator 3 exactly onto one tilting mirror of the image modulator 5, with the result that each tilting mirror (also referred to below as an illumination pixel) of the illumination modulator 3 is assigned exactly one tilting mirror (also referred to below as an image pixel) of the image modulator 5. Other assignments of image and illumination pixels are also possible. For example, an offset in the row direction can be brought about by each image pixel being illuminated by two illumination pixels (in each case halfway).

The two modulators 3 and 5 are driven by the control unit 7 on the basis of supplied image data BD such that the illumination modulator 3, on which the light (e.g. white light) from the light source 2 impinges, is a light source modulated two-dimensionally for the image modulator 5, which generates or modulates the image to be projected, which is then projected onto a projection surface 10 by means of the projection optical unit 6.

The illumination modulator 3 can be driven in a manner such that only the light that is reflected by those tilting mirrors of the illumination modulator 3 that are assigned to a tilting mirror of the image modulator 5 that is to generate a non-black image point in the image is imaged onto the image modulator 5. This may lead to light not impinging on image pixels of the image modulator 5 that are intended to represent black image points (because the assigned illumination pixels or the light reflected thereby is not imaged on the image modulator 5). This advantageously has the result that the black level (that is to say the undesired remaining brightness of a black image point in the actually projected image) can be significantly reduced.

Figure 2:
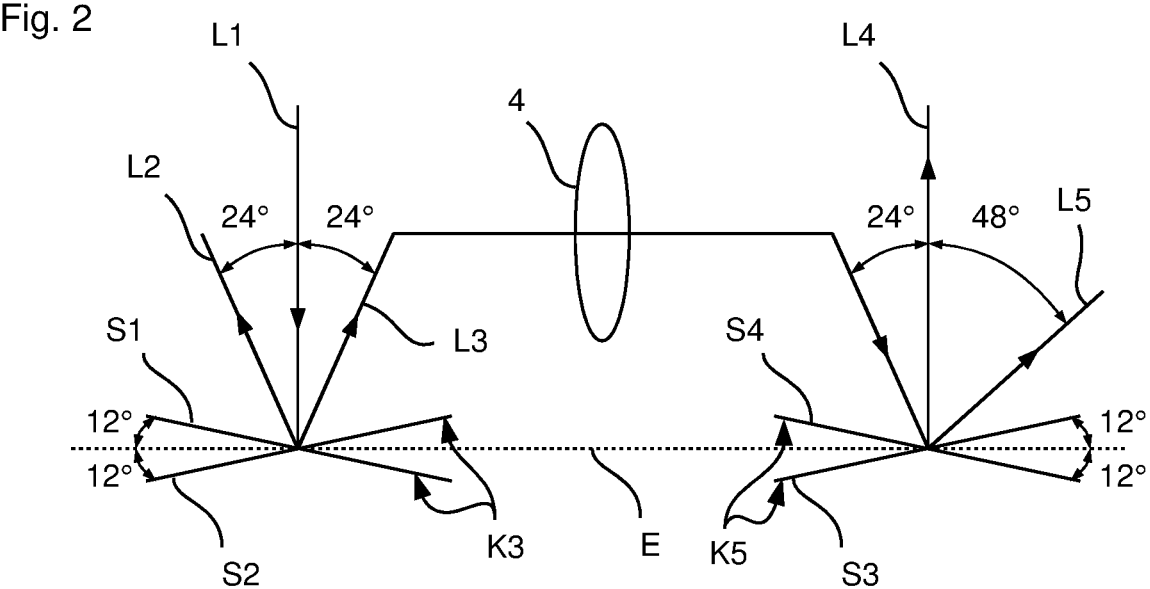
FIG. 2 shows a schematic illustration for explaining the light modulation with the two tilting mirror matrices 3, 5 of the projector 1 of FIG. 1.
Figure 3:
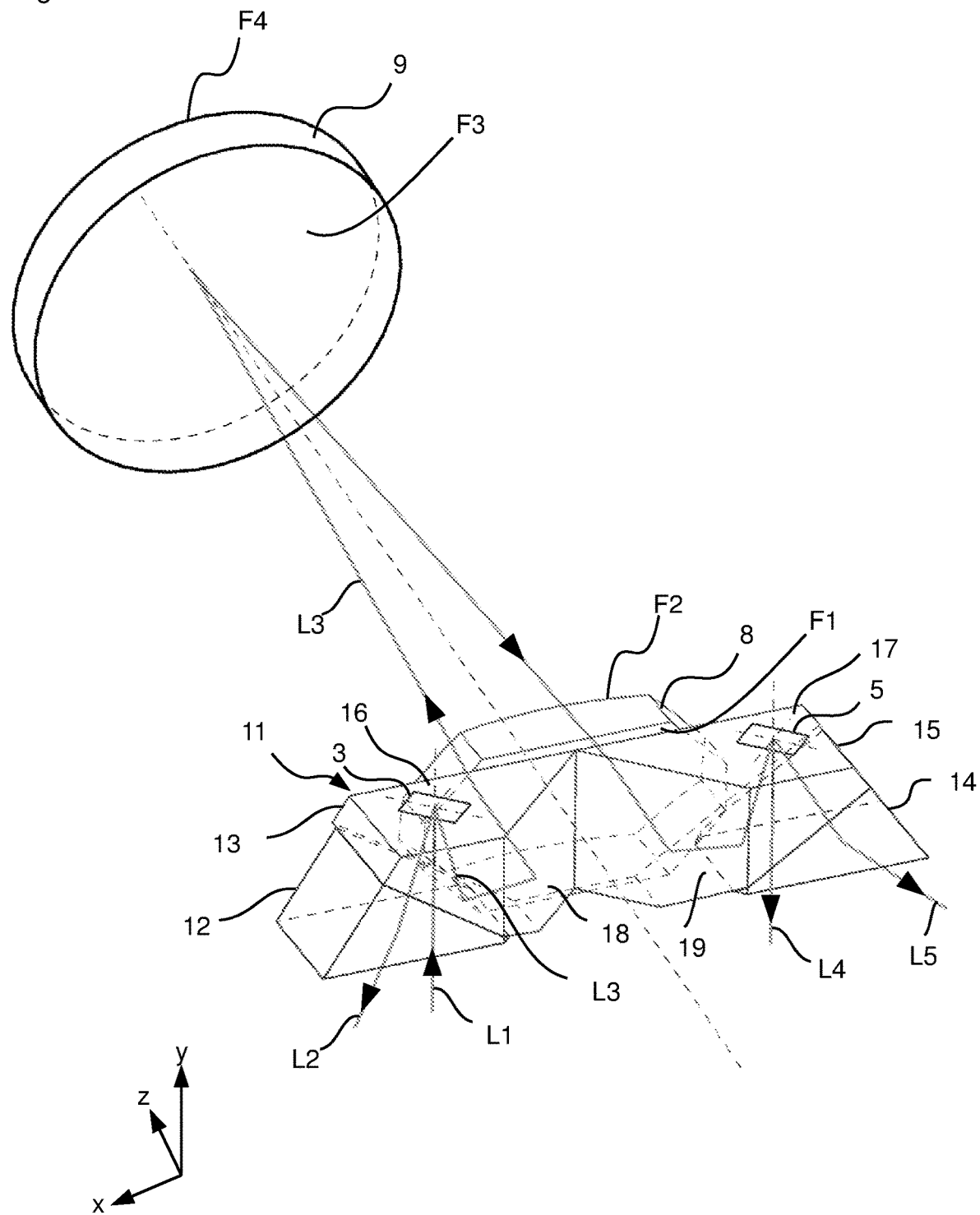
FIG. 3 shows a perspective view of the intermediate imaging optical unit 4 of the projector 1 of FIG. 1.
Figure 4:
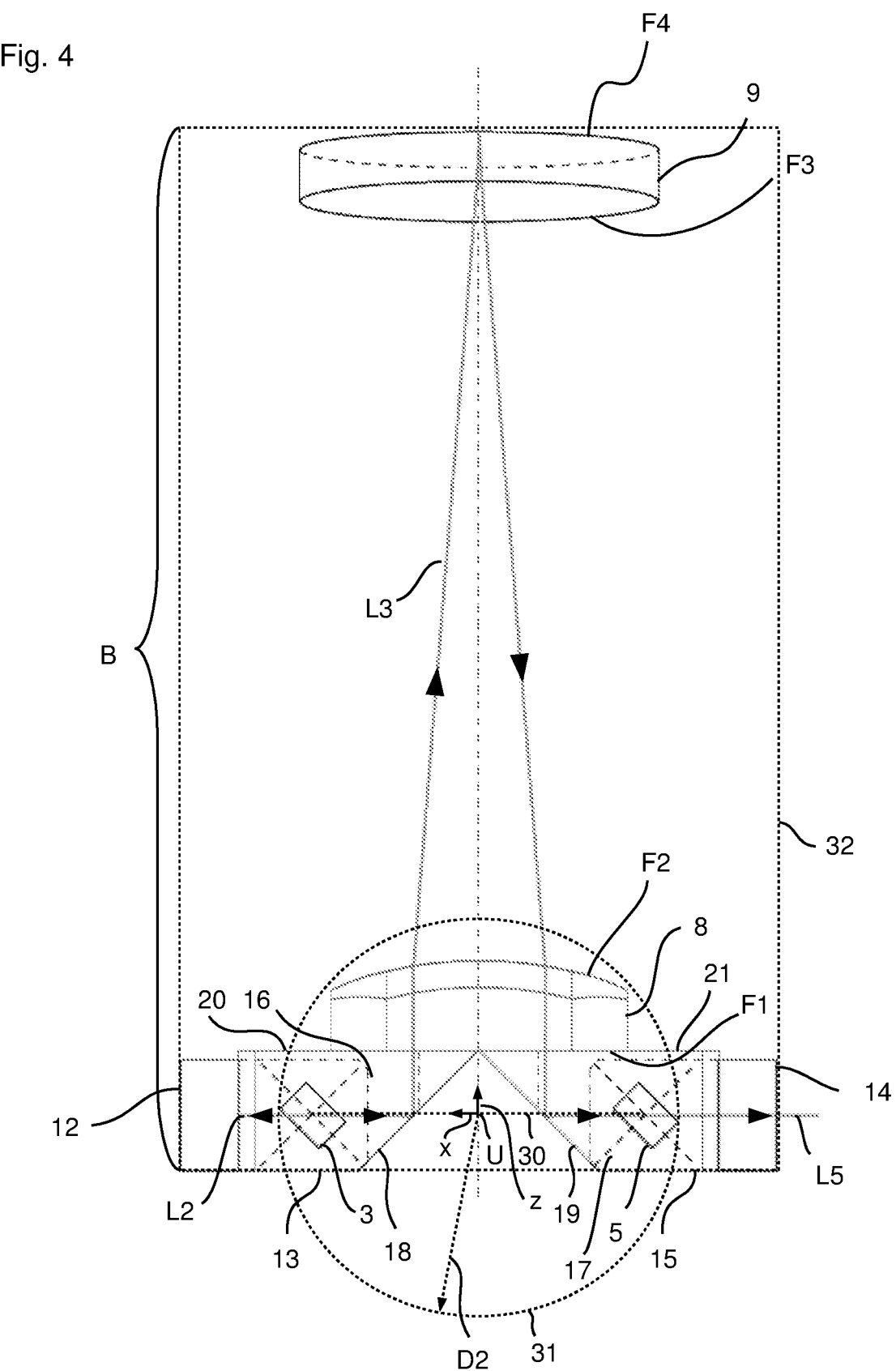
FIG. 4 shows a plan view of the intermediate imaging optical unit 4 of the projector 1 of FIG. 1.
Figure 5:
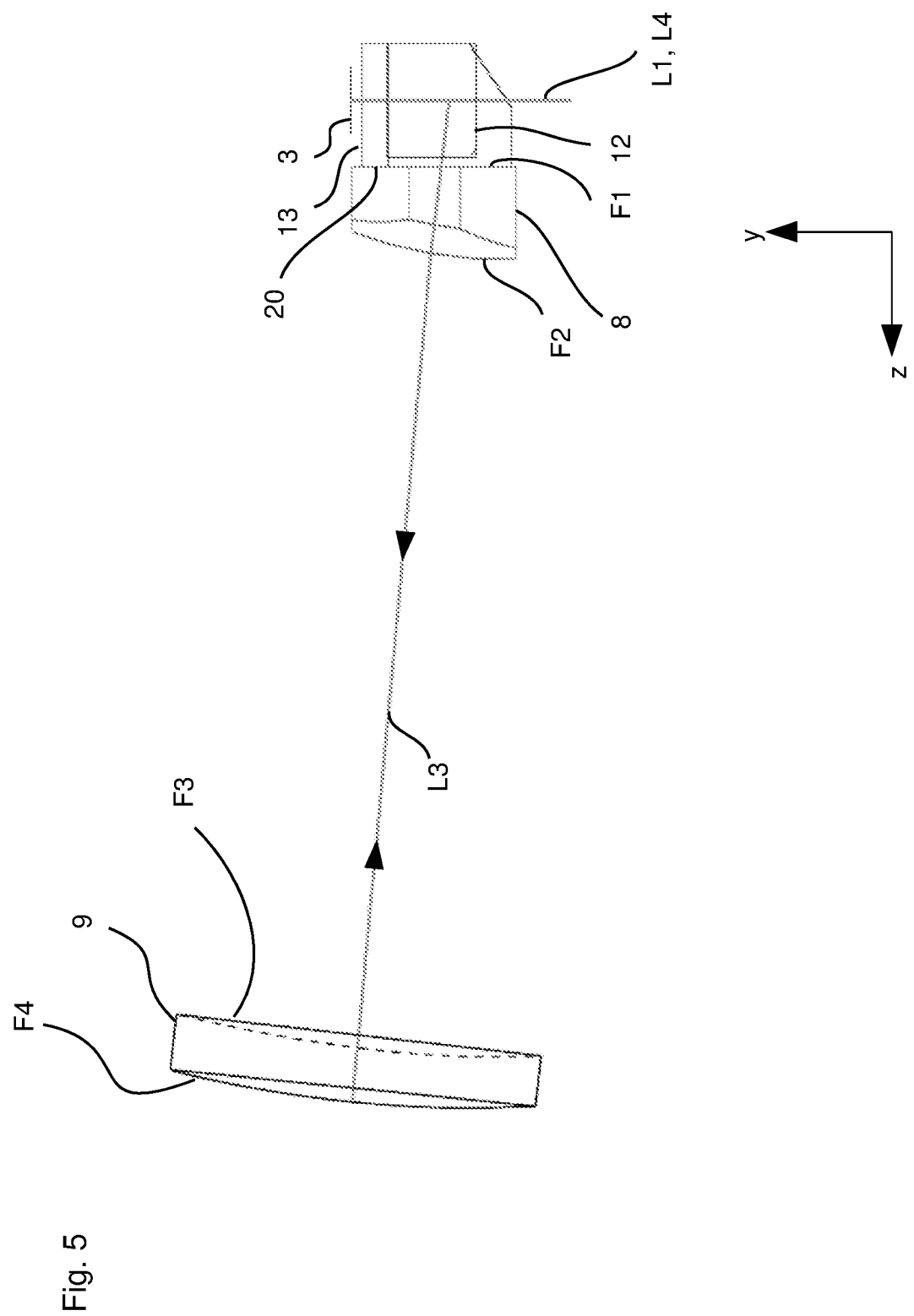
FIG. 5 shows a side view of the intermediate imaging optical unit of the projector 1 of FIG. 1.
Figure 20:
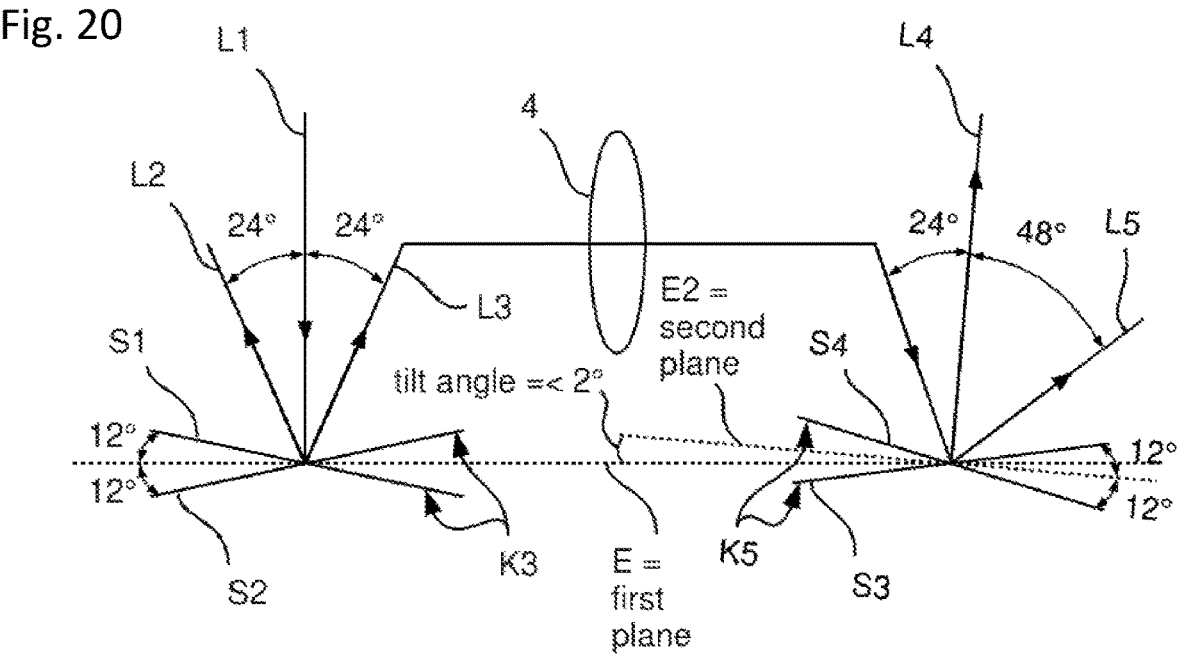
FIG. 20 shows another schematic illustration for explaining the light modulation with the two tilting mirror matrices 3, 5 of the projector 1 of FIG. 1.

A more detailed description of the specific embodiment of the intermediate imaging optical unit 4, shown in FIGS. 3 to 5, and of the arrangement of the two tilting mirror matrices 3 and 5 is preceded by an explanation, initially in connection with the schematic illustration of FIGS. 2 and 20, of how the light modulation with the two tilting mirror matrices 3 and 5 is brought about.

Representative for each tilting mirror matrix 3, 5, in each case only a single tilting mirror K3, K5, in its two possible tilted positions, is drawn in FIGS. 2 and 20. The tilting mirrors K3 and K5 are shown in a sectional illustration, which is chosen such that the respective tilting axis of the two tilting mirrors K3 and K5 is perpendicular to the plane of the drawing. Since the two modulators 3 and 5 lie in a common plane E (also referred to below as a reference plane E), the tilting axes of the tilting mirrors K3 and K5 lie in this plane E, which is illustrated as a dashed line in the sectional illustration of FIGS. 2 and 20.

The tilting mirror K3 of the modulator 3 can be either in its first tilted position S1 or in a second tilted position S2. Both tilted positions are inclined by 12° with respect to the plane E. FIGS. 2 and 20 show both tilted positions S1 and S2. The tilting mirror K3 can of course adopt only one of the two tilted positions S1, S2 at a time. The same is true for the tilting mirror K5 of the image modulator 5. The tilting mirror K5 can be either in its first position S3 or in its second position S4.

During the operation of the projector 1, light L1 from the light source 2 impinges on the tilting mirror K3 such that the light L1 is incident on the tilting mirror K3 perpendicularly to the plane E. If the tilting mirror K3 is in its second position S2, the light, since the tilting mirror K3 is tilted counterclockwise by 12° relative to the plane E, will be reflected onto a beam trap (not shown) at an angle of 24° with respect to the direction of incidence of the light L1 as what is known as off-light L2. This off-light L2 is not used to illuminate the image modulator 5.

However, if the tilting mirror K3 is in its first position S1, the light is reflected at an angle of 24° relative to the direction of incidence of the light L1 as what is known as on-light L3. This on-light L3 is imaged, as will be described in more detail below, onto the assigned tilting mirror K5 of the image modulator 5 by means of the intermediate imaging optical unit 4. The direction of incidence of the on-light L3 onto the tilting mirror K5 is selected here such that the reflected light L4, if the tilting mirror K5 is in its first position S3, is perpendicular to the plane E. To this end, the light L3 that is incident on the tilting mirror K5 has an angle of 24° with respect to the vertical of the plane E. In the first tilted position S3 of the tilting mirror K5, this produces the desired reflection, with the result that the light can thus be projected, as on-light L4, onto the projection surface 10 by means of the projection optical unit 6.

If the second tilting mirror K5 is in its second tilted position S4, the light is reflected, as off-light L5, at an angle of 48° relative to the vertical of the plane E. This off-light is guided into a beam trap (not shown) and is not used in the image projection onto the projection surface 10, In this way, it is possible by means of the first tilting mirror matrix 3 to provide the two-dimensionally modulated light source in which at least all tilting mirrors of the illumination modulator 3 that are imaged onto a tilting mirror of the image modulator 5 that is intended to represent a non-black image point are brought into the first tilted position. It is then possible by means of the image modulator 5 to switch the illuminated tilting mirrors K5 into their first and second tilted positions such that, during the duration T of a single-image representation, the desired brightness of the corresponding image point is generated. The brightness can be set by the relationship of the time durations during which the tilting mirror K5 is in its first position and during which the tilting mirror K5 is in its second position. Driving the two modulators is effected using pulse-width-modulated control data, which the control unit 7 produces based on the supplied control data BD.

As is evident from FIGS. 3 to 5, a beam separation module 11 (which will also be referred to below as a deflection optical unit) separating the on-light L3, L4 reflected by the modulators 3, 5 from the off-light L2, L5 reflected by the modulators 3, 5 is arranged between the intermediate imaging optical unit 5, which comprises the planoconvex lens 8 and the lens 9, which has been made reflective on the rear-side, and the two modulators 3, 5. To this end, the beam module comprises a first and second prism 12, 13 for the illumination modulator 3 and a third and fourth prism 14, 15 for the image modulator 5.

One of the modulators 3, 5 is arranged in each case on the top sides 16, 17 of the second and fourth prisms 13, 15. The top sides 16, 17 lie in the same plane such that the tilting mirrors or the tilting axes of the tilting mirrors of the two modulators 3, 5 lie in the common plane E. Since the tilting axes of the tilting mirrors are diagonal to the rectangular region in which the tilting mirrors are arranged in rows and columns, the two modulators 3, 5 are arranged on the top sides 16 and 17 rotated in the plane E such that the tilting axes of the tilting mirrors extend in the z-direction.

The prisms 12 and 13, which are made from the same material, are separated from each other by a thin air gap (approx. 3-6 μm), with the result that the on-light L3 is reflected by the illumination modulator 3 toward the right side face 18 of the prism 13 due to total internal reflection at the interface of the prism 13 to the air gap in the xy-plane (the on-light coming from the illumination modulator 3 and the on-light L3 reflected due to total internal reflection lie in the xy-plane). The right side face 18 has been made reflective and is inclined by 45° relative to the on-light L3 that is incident thereon, with the result that a 90° deflection in the xz-plane in the direction of the intermediate imaging optical unit 4 takes place on the right side 18.

The off-light L2 of the illumination modulator 3, by contrast, is not reflected at the interface of the prism 13 to the air gap, but rather travels through said interface, the air gap, and the first prism 12 and is then captured by a beam trap (not shown). Consequently, a separation of the on-light and the off-light is brought about by the two prisms 12 and 13 and the air gap that is located therebetween.

The third and fourth prisms 14, 15 are embodied substantially mirror-symmetrically relative to the yz-plane to the first and second prisms 12, 13. Again, a thin air gap is present between the two prisms 14, 15. As is clear from the ray profile in FIG. 3, the on-light L3 coming from the intermediate imaging optical unit 4 is reflected at the left side face 19 of the fourth prism 15, which has been made reflective, by 90° in the xz-plane and is then reflected upwardly onto the image modulator 5 due to total internal reflection at the interface of the fourth prism 15 to the air gap in the xy-plane such that the on-light L3 is incident on the image modulator 5 at an angle of 24° relative to the normal of the plane E. The on-light from the image modulator 5 travels perpendicularly to the plane E in the y-direction through the two prisms 15 and 14 and the air gap located therebetween and is then projected onto the projection surface 10 by means of the projection optical unit 6 (not shown in FIGS. 3 to 5). The off-light L5, by contrast, is reflected by the modulator 5 at an angle of 48° relative to the vertical of the plane E and, after traveling through the prisms 15 and 14 and the air gap, is captured by a beam trap (not shown).

A very compact arrangement of the two modulators 3, 5 is possible by means of the beam separation module 11. The beam separation of on-light and off-light is also easily realized, which means there is still sufficient space for example for the projection optical unit 6.

The beam module 11 or at least the prisms 12 and 13 together with the light source 2 ensure that the first modulator 3 is illuminated perpendicularly with the light L1 and can therefore also be referred to as illumination module.

The intermediate imaging optical unit 4 is designed such that it does not limit the maximum possible etendue of the tilting mirror matrices 3, 5. The numerical aperture (sine of the maximum acceptance angle of the beams) in this case is 0.20 and the angle between the chief rays of the imaging beams and the modulator normal is 24°. The intermediate imaging optical unit 4 is designed for a usable wavelength range from 400 to 700 nm.

The planoconvex lens 8 comprises a planar surface F1, which is cemented with the likewise planar rear faces 20, 21 of the prisms 13, 15, as can be seen best in FIG. 4, and a convex surface F2. The convex surface F2 is a free-form surface, which is non-spherical and not rotationally symmetric and exhibits no mirror symmetry and which can be described according to the following formula 1

$$z = \frac{(x^2 + y^2)/R}{1 + \sqrt{1 - (1+k) \cdot \frac{(x^2 + y^2)}{R^2}}} + \sum_{m,n=1}^{\infty} C_{m,n} \frac{1}{N_{Radius}^{n+m}} x^m y^n \quad (1)$$

Here, x, y and z denote the three Cartesian coordinates of a point lying on the surface F2 in the local surface-related coordinate system. The local surface-related coordinate system of the surface F2 and thus the surface F2 is rotated clockwise (in FIG. 5) through 22.4° about the x-axis of the local surface-related coordinate system of the rear surfaces 20, 21, which is shown in FIGS. 3-5. R, k and the polynomial coefficients with the associated expansion terms are stated in table 1 below.

A sufficiently good correction of all image errors is generally achieved if the polynomial expansion of the surface contains terms up to the maximum order $n+m \leq 10$. In the exemplary embodiment, terms up to the order $n+m \leq 10$ were used, wherein, unlike in the known systems, asymmetric terms not equal to zero also occur in the x-coordinate.

The described exemplary embodiment of the projection system has a maximum structural size for the optical unit of 500 mm along the z-axis, wherein all optical elements (in particular including the prisms) are formed from NBK7 from SCHOTT AG, Hattenbergstrasse 10, 55122 Mainz, Germany, with an Abbe number of 64.2 and a refractive index of 1.51680 at the d-line (587 nm) and an Abbe number of 64.0 and a refractive index of 1.51872 at the e-line (546 nm). NBK7 is a preferred material because it is cost-effective and easy to process and exhibits high transmission and low thermal expansion.

The glass path from the top side 16 of the second prism 13 to the convex side of the planoconvex lens 8 is 141.5 mm. The coefficients $C_{m,n}$ according to formula 1 are stated in table 1 below. To simplify the illustration, the coefficients $C_{m,n}$ are given as XmYn, but n,m is given here only for values of greater than or equal to 2. For example, X in table 1 thus denotes the coefficient $C_{1,0}$, and, for example, XY2 denotes $C_{1,2}$.

TABLE 1

| | | | | | |
|---|---|---|---|---|---|
| X | −1.8091E−02 | Y | −2.5105E−02 | X2 | 6.9276E−01 |
| XY | −2.3456E−01 | Y2 | 6.1624E−01 | X3 | 9.4743E−02 |
| X2Y | 2.1066E−01 | XY2 | −1.6709E+00 | Y3 | −5.1034E−01 |
| X4 | 3.9419E−01 | X3Y | 1.1488E+00 | X2Y2 | 2.2398E+00 |
| XY3 | −5.9402E+00 | Y4 | −1.0470E+00 | X5 | −1.3452E−01 |
| X4Y | 4.1326E−02 | X3Y2 | 7.6991E+00 | X2Y3 | 7.1810E+00 |
| XY4 | −1.0972E+01 | Y5 | −6.3221E−01 | X6 | −5.6510E−01 |
| X5Y | −7.4337E−01 | X4Y2 | −2.0793E+00 | X3Y3 | 2.1386E+01 |
| X2Y4 | 1.8922E+01 | XY5 | −9.8700E+00 | Y6 | 1.8509E+00 |
| X7 | 8.6148E−02 | X6Y | −1.4166E+00 | X5Y2 | −8.8067E+00 |
| X4Y3 | 4.6394E−01 | X3Y4 | 1.7501E+01 | X2Y5 | 3.6844E+01 |
| XY6 | 1.2581E−01 | Y7 | 2.4286E+00 | X8 | 3.5254E−01 |
| X7Y | −2.0896E+00 | X6Y2 | 7.7845E−01 | X5Y3 | −3.5358E+01 |
| X4Y4 | 1.8385E+01 | X3Y5 | −1.8105E+01 | X2Y6 | 4.4238E+01 |
| XY7 | 1.1560E+01 | Y8 | −1.1428E+00 | X9 | −3.0223E−01 |
| X8Y | 1.0784E+00 | X7Y2 | −8.3917E+00 | X6Y3 | 6.1229E+00 |
| X5Y4 | −4.9734E+01 | X4Y5 | 3.0199E+01 | X3Y6 | −3.5415E+01 |
| X2Y7 | 2.6380E+01 | XY8 | 1.2759E+01 | Y9 | −3.1670E+00 |
| X10 | −4.4072E−02 | X9Y | −7.5280E−01 | X8Y2 | 1.1240E+00 |

TABLE 1-continued

| X7Y3 | −6.7680E+00 | X6Y4 | 4.8486E+00 | X5Y5 | −2.2578E+01 |
|---|---|---|---|---|---|
| X4Y6 | 1.4058E+01 | X3Y7 | −1.4585E+01 | X2Y8 | 5.5247E+00 |
| XY9 | 4.7407E+00 | Y10 | −1.3083E+00 | | 8.0000E+01 |
| k | 0 | | | | |
| $N_{Radius}$ | 8.0000E+01 | | | | |
| R | −170.52 | | | | |

The glass path of the on-light L3 from the top side 16 of the second prism 13 to the surface F2 is just as long as the glass path of the on-light L3 reflected at the mirror surface F4 from the surface F2 to the top side 17 of the fourth prism 15.

The second lens 9 is embodied in the form of an off-axis section of a lens with a first and second spherical interface, wherein the surface F3 is an off-axis section of the first spherical interface having a radius of curvature of −507.78 mm and the surface F4 is an off-axis section of the second spherical interface having a radius of curvature of −499.23 mm. The two spherical interfaces are spaced apart from one another in the axial direction along the z-axis of the coordinate system by 15.0 mm. The axial direction is here the z-direction of the local coordinate system of the surface F2 before its rotation through 22.4°. The axial distance of the local coordinate origins of the surfaces F2 and F3 is 340.0 mm. The two tilting mirror matrices 3, 5 each have a glass cover (NBK7) with a thickness of 3.0 mm, which is arranged at a distance of around 0.48 mm from the midpoints of the tilting mirrors and by 0.1 mm from the corresponding top side 16, 17 of the second or fourth prism 13, 15.

Table 2 below shows the distortion (deviation of the chief ray intersection points of a beam coming from the first tilting mirror matrix 3 from the midpoint of the respectively assigned pixel of the second tilting mirror matrix 5 in the plane thereof) for a grid of 5×5 field points distributed regularly over the surface of the first tilting mirror matrix 3. The x-coordinates and y-coordinates are in reference to the right-handed Cartesian coordinate system, shown in FIG. 4, with the coordinate origin U.

TABLE 2

| x-Coordinate of the field point in mm | y-Coordinate of the field point in mm | x-Distortion in μm | y-Distortion in μm | Field point No. |
|---|---|---|---|---|
| 28.838 | 16.758 | −2.56361 | −0.37899 | 1 |
| 34.318 | 11.278 | −1.89184 | 2.61848 | 2 |
| 39.798 | 5.798 | 1.47416 | 1.4299 | 3 |
| 45.278 | 0.318 | 3.76699 | −0.545741 | 4 |
| 50.758 | −5.162 | 0.700509 | −5.01965 | 5 |
| 25.939 | 13.859 | −2.58217 | −1.09282 | 6 |
| 31.419 | 8.379 | −1.76816 | 2.17349 | 7 |
| 36.899 | 2.899 | 0.742337 | 2.28815 | 8 |
| 42.379 | −2.581 | 1.64596 | 1.82817 | 9 |
| 47.859 | −8.061 | −2.09453 | −2.03628 | 10 |
| 23.04 | 10.96 | −1.77547 | −1.75217 | 11 |
| 28.52 | 5.48 | −0.694947 | 1.37354 | 12 |
| 34.00 | 0.00 | 1.17218 | 2.25062 | 13 |
| 39.48 | −5.48 | 1.05768 | 2.73327 | 14 |
| 44.96 | −10.96 | −2.92518 | −0.490348 | 15 |
| 20.141 | 8.061 | −0.659351 | −2.59233 | 16 |
| 25.621 | 2.581 | 0.718347 | −0.00782425 | 17 |
| 31.101 | −2.899 | 2.10682 | 1.16095 | 18 |
| 36.581 | −8.379 | 1.27586 | 2.27763 | 19 |
| 42.061 | −13.859 | −2.67946 | 0.091155 | 20 |
| 17.242 | 5.162 | 0.434282 | −3.77185 | 21 |
| 22.722 | −0.318 | 2.06756 | −2.09796 | 22 |
| 28.202 | −5.798 | 3.05967 | −1.02122 | 23 |
| 33.682 | −11.278 | 1.67029 | 0.613244 | 24 |
| 39.162 | −16.758 | −2.22975 | −0.0357044 | 25 |

At each point of the second tilting mirror matrix 5, the distortion is less than approximately 5 μm and consequently less than one pixel width of the second tilting mirror matrix 5, which in the case of a 4K resolution with 3840×2160 tilting mirrors is 5.4 μm. The surface to be imaged of the tilting mirror matrices is 31 mm×16.4 mm. In the tilting mirror matrices, each tilting mirror can have a square shape, wherein the edge length can be approximately 5 μm. A pixel width in this case is understood to mean in particular the edge length of a tilting mirror plus the necessary gap to the adjacent tilting mirror.

Figure 6:
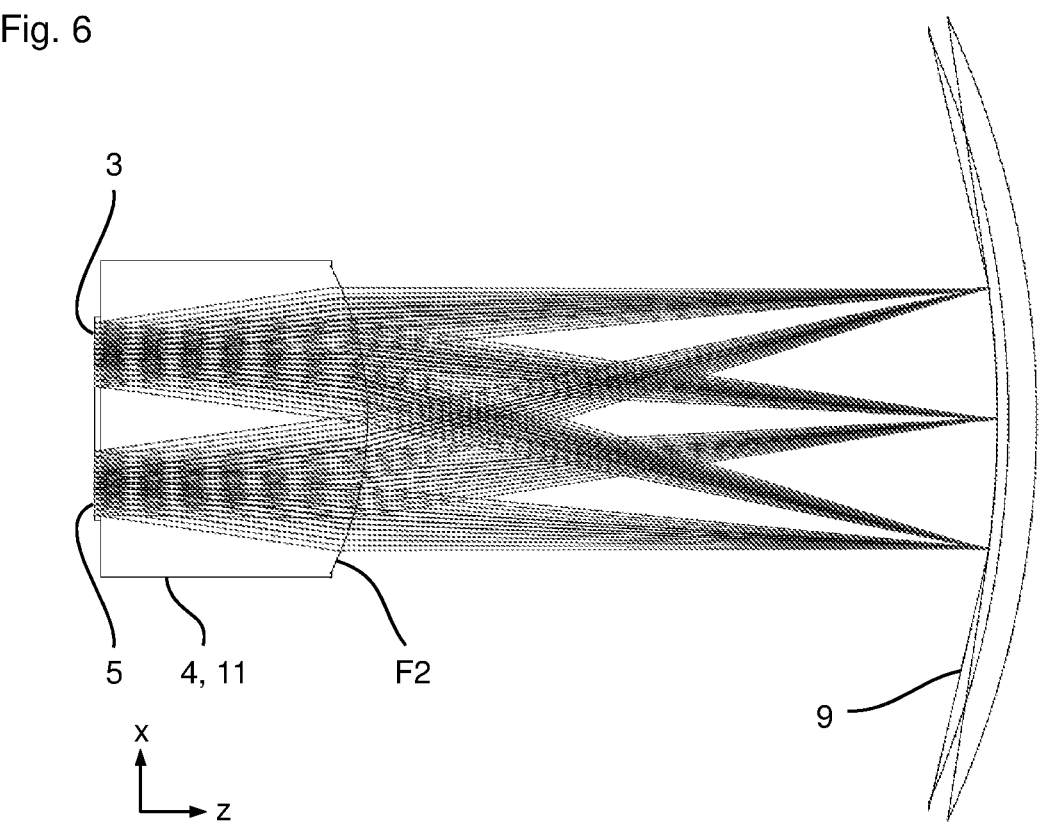
FIG. 6 shows the ray profiles of the unfolded beam path of the first exemplary embodiment in the xz section.
Figure 7:
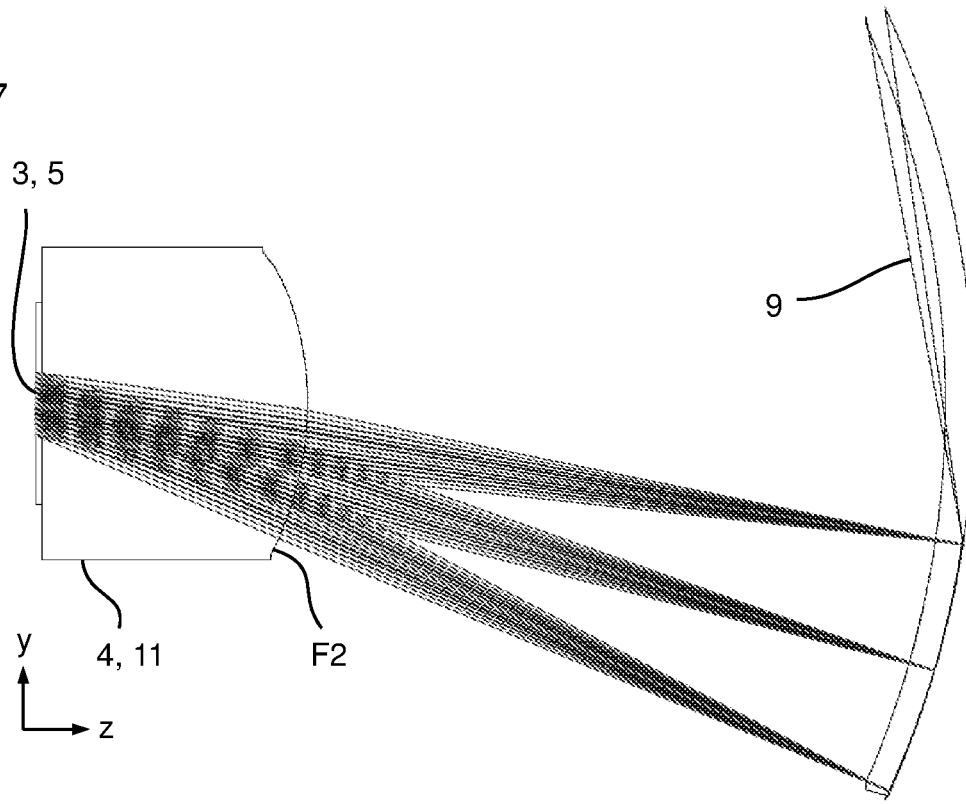
FIG. 7 shows the ray profiles of the unfolded beam path of the first exemplary embodiment in the yx section.

FIG. 6 shows the ray profiles of the unfolded beam path in the xz-section (projection of the beams onto the xz-plane), and FIG. 7 shows the ray profiles of the unfolded beam path in the yz-section (projection of the beams onto the yz-plane). The deflection optical unit 11 and the planoconvex lens are here illustrated schematically as a block.

Owing to the projection of the beams onto the xz-plane in FIG. 6, it initially appears in FIG. 6 as if the reflection might not take place at the rear side of the mirror meniscus lens 9. Of course the reflection takes place at the rear side of the mirror meniscus lens 9, but at a location that is offset in the y-direction with respect to the plane of the drawing (xz-sectional plane of the global coordinate system) (according to the numerical indication relating to the offset of the aperture stop), whose projection into the global xz-plane is offset to the front with respect to the intersecting line of the surface with the xz-plane.

Figure 8:
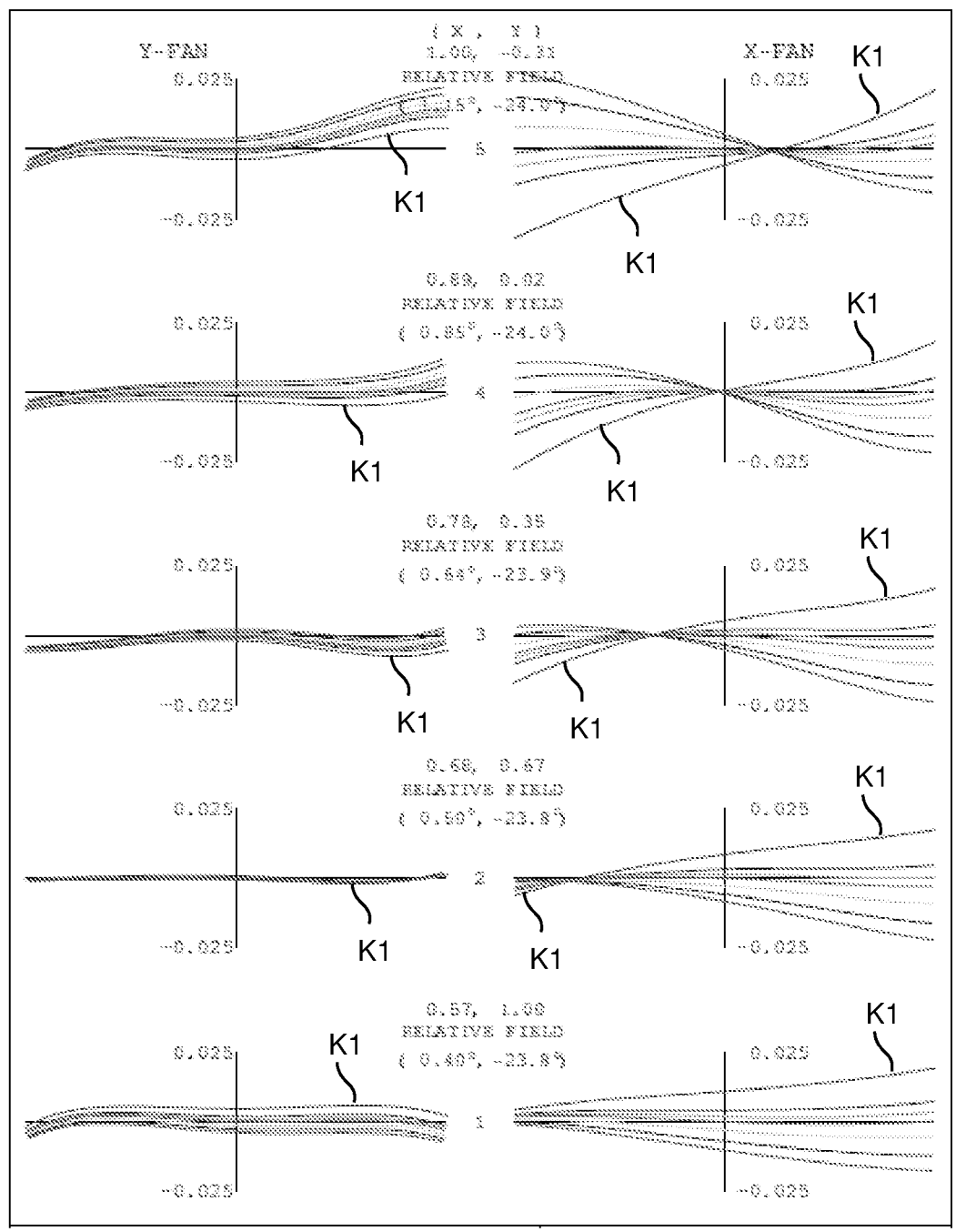
FIGS. 8-12 show transverse aberration curves in the xz section (left column) and in the yz section (right column) for 25 different field beams.
Figure 9:
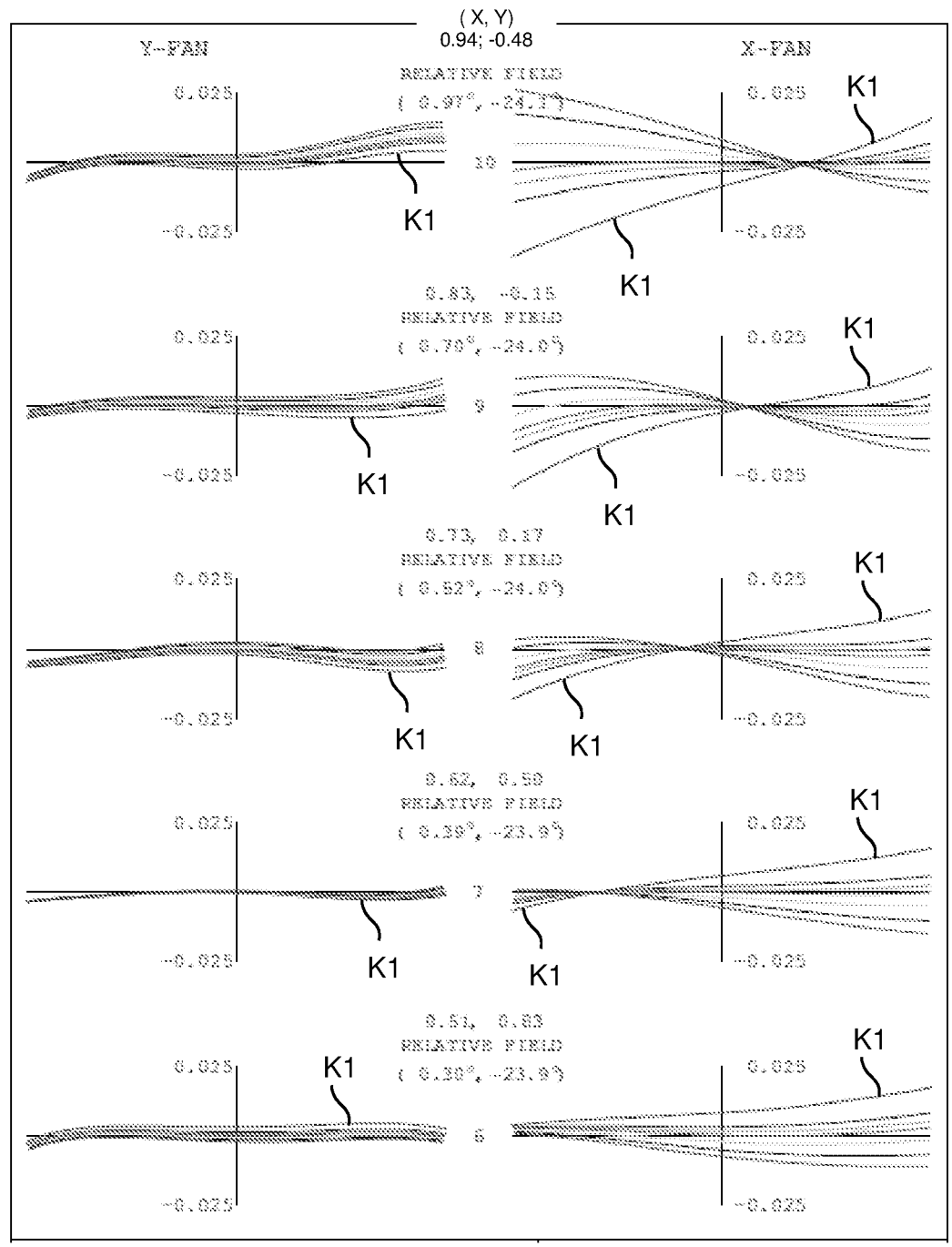
Figure 10:
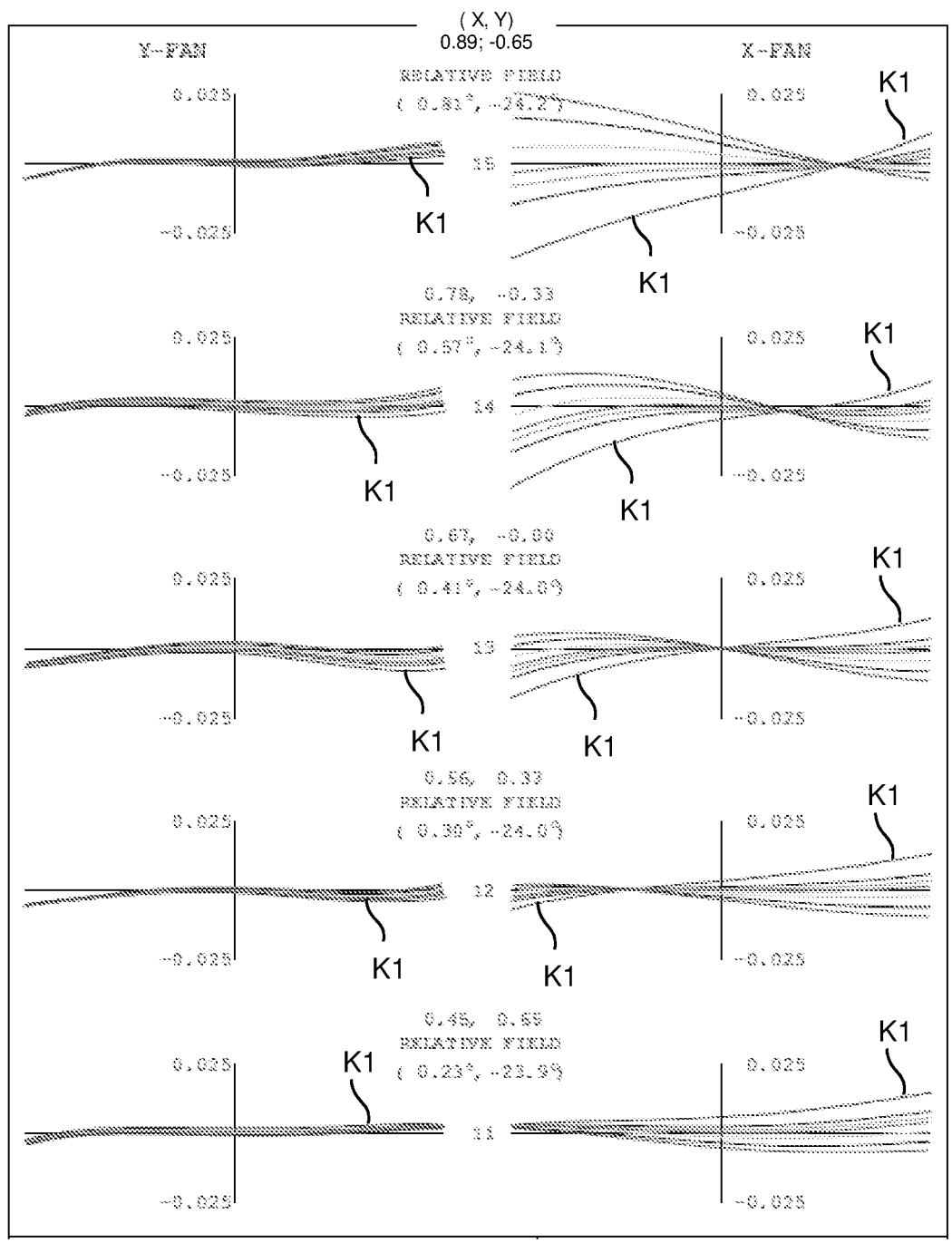
Figure 11:
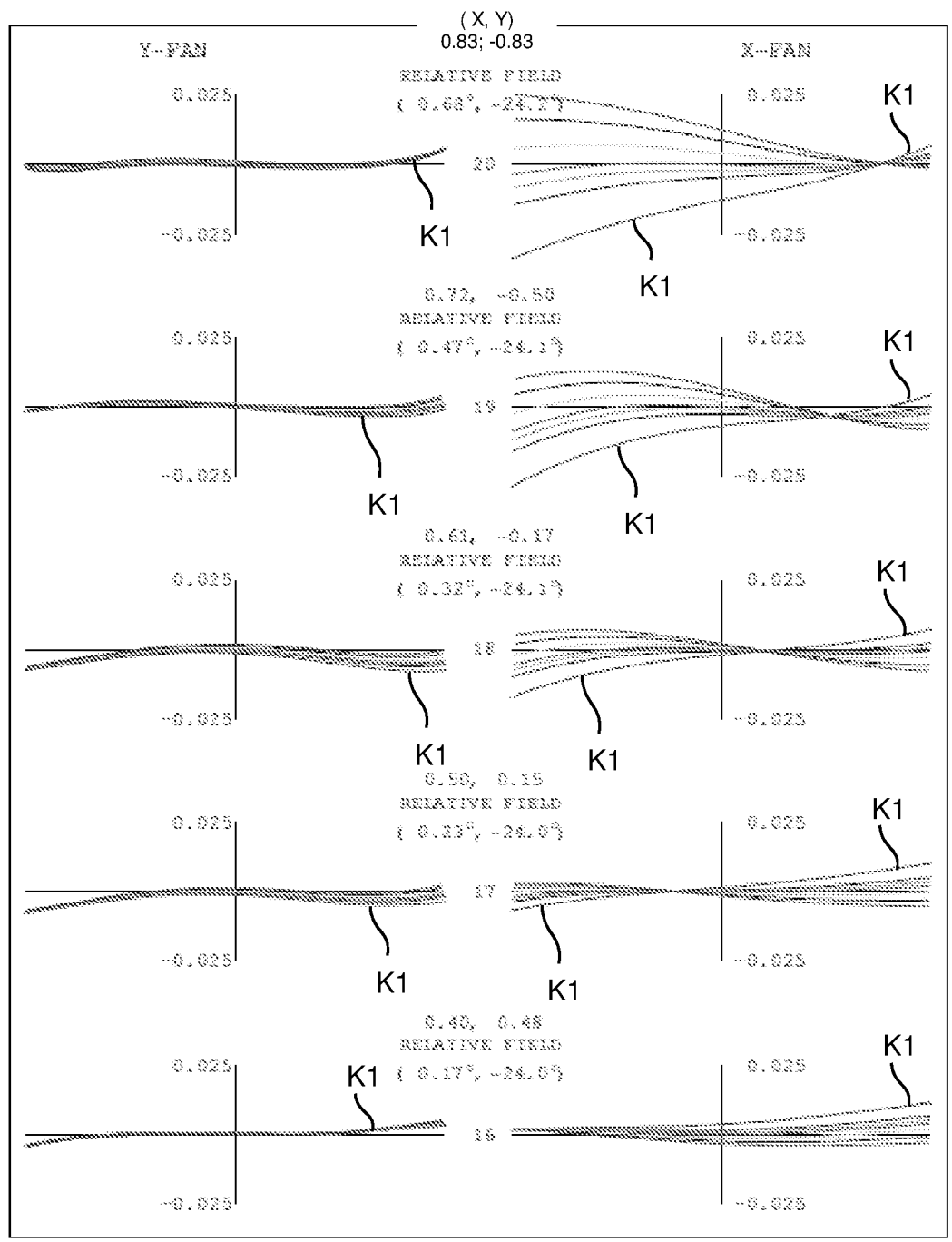
Figure 12:
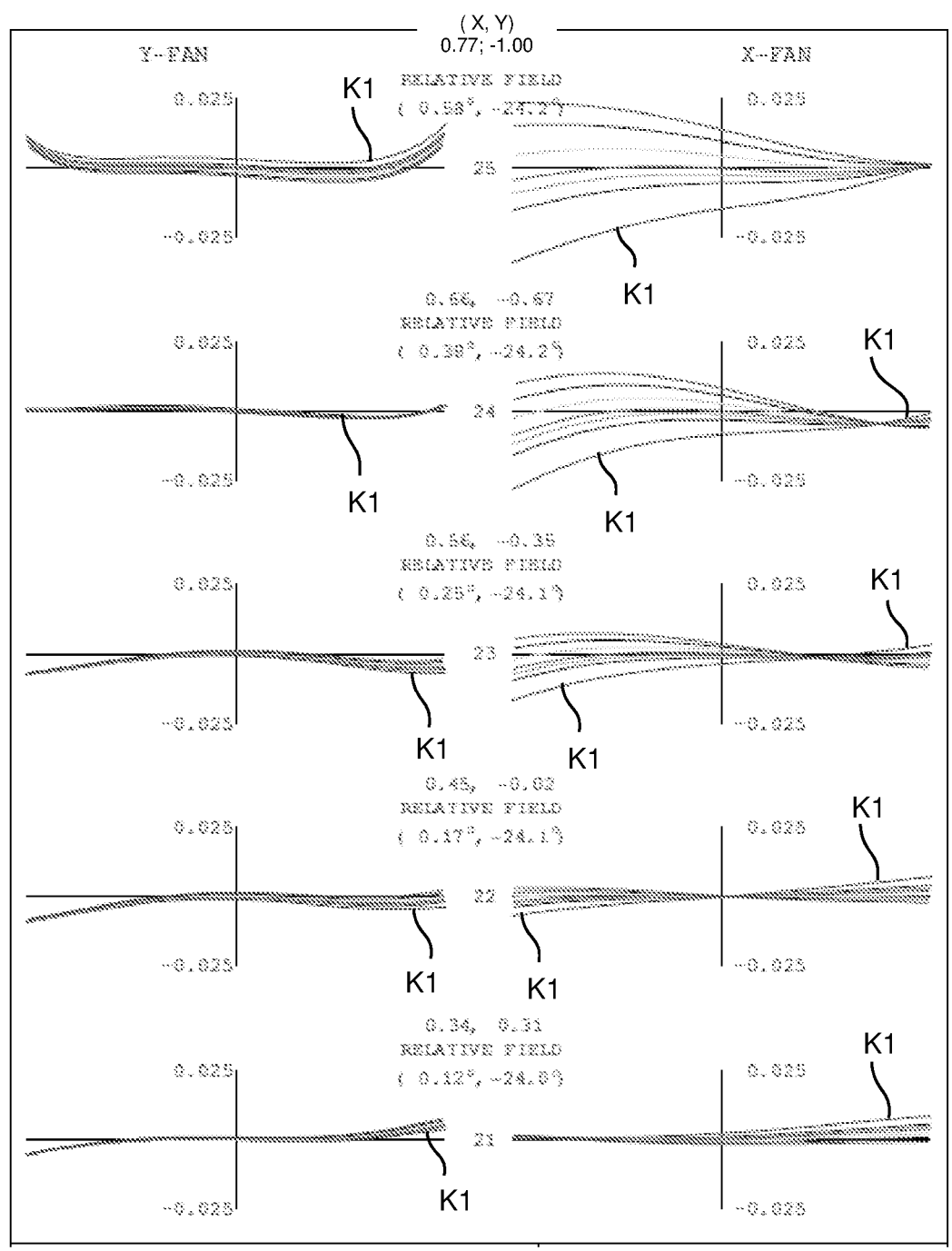

The following FIGS. 8 to 12 show the imaging quality by way of the transverse aberration curves in the yz-plane (over the pupil coordinate in the yz-plane; in each case the left-hand column and denoted as "Y-FAN") and in the xz-plane (over the pupil coordinate in the xz-plane; in each case the right-hand column and denoted as "X-FAN") for the field beams which belong to the same field beams from table 2 which are distributed 5×5 equidistantly over the image field. The field point numbers according to table 2 are indicated here between the transverse aberration curves. For example, FIG. 8 shows, from top to bottom, the transverse aberration curves for the field points 5, 4, 3, 2 and 1. The image errors are shown in millimetres in each case for the wavelengths 656, 587, 546, 486, 435 and 404 nm, wherein the different curves are not labeled individually. Furthermore shown is the profile as the curve K1 for the wavelength 1050 nm from the near infrared. It is essential that very low transverse aberrations are present for all wavelengths mentioned. The illustrations in FIGS. 8 to 12 are representation types of the optical design software Code V, which are known to a person skilled in the art.

A further embodiment of the projection system according to the invention will be described below, in which a very compact structural size of only 450 mm simultaneously with a good correction of the distortion and other aberrations is made possible by using a higher-refractive glass type in the prisms. Table 3 specifies the polynomial coefficients of formula 1 in the same way as in table 1.

TABLE 3

| | | | | | |
|---|---|---|---|---|---|
| X | −6.3475E−03 | Y | −3.1112E−02 | X2 | 3.8939E+00 |
| XY | −7.3389E−02 | Y2 | 3.7231E+00 | X3 | 4.1410E−02 |
| X2Y | 2.3055E−01 | XY2 | −5.2894E−01 | Y3 | −6.2492E−01 |
| X4 | 7.2618E−01 | X3Y | 4.1281E−01 | X2Y2 | 3.1188E+00 |
| XY3 | −2.0723E+00 | Y4 | −3.6458E−01 | X5 | −7.5666E−02 |
| X4Y | −1.9722E−01 | X3Y2 | 2.3893E+00 | X2Y3 | 5.9415E+00 |
| XY4 | −4.5920E+00 | Y5 | −2.0135E−02 | X6 | −2.1464E−01 |
| X5Y | −5.7871E−01 | X4Y2 | −3.5491E+00 | X3Y3 | 6.2132E+00 |
| X2Y4 | 9.5812E+00 | XY5 | −6.1265E+00 | Y6 | 1.7010E+00 |
| X7 | 5.6027E−03 | X6Y | −1.2604E+00 | X5Y2 | −4.1619E+00 |
| X4Y3 | −1.1926E+01 | X3Y4 | 4.2063E+00 | X2Y5 | 7.3964E+00 |
| XY6 | −4.6621E+00 | Y7 | 9.2748E−01 | X8 | 1.1641E−01 |
| X7Y | −7.7459E−01 | X6Y2 | −2.0857E+00 | X5Y3 | −1.4208E+01 |
| X4Y4 | −1.5233E+01 | X3Y5 | −7.2569E+00 | X2Y6 | 2.1583E+00 |
| XY7 | −7.8304E−01 | Y8 | −1.7998E+00 | X9 | −9.0852E−02 |
| X8Y | 2.6261E−01 | X7Y2 | −3.0109E+00 | X6Y3 | −1.1536E+00 |
| X5Y4 | −1.9037E+01 | X4Y5 | −7.6712E+00 | X3Y6 | −1.1818E+01 |
| X2Y7 | −1.1598E+00 | XY8 | 1.6567E+00 | Y9 | −2.4289E+00 |
| X10 | −7.8345E−03 | X9Y | −2.4669E−01 | X8Y2 | 2.3460E−01 |
| X7Y3 | −2.4565E+00 | X6Y4 | 2.6428E−01 | X5Y5 | −8.463E+00 |
| X4Y6 | −8.6501E−01 | X3Y7 | −4.559E+00 | X2Y8 | −8.8851E−01 |
| XY9 | 9.3225E−01 | Y10 | −8.2504E−01 | | |
| k | 0 | | | | |
| NRadius | 8.000E+01 | | | | |
| R | −167.84 | | | | |

The glass path from the top side 16 of the second prism 13 to the convex side of the planoconvex lens 8 is 164.4 mm. The glass path of the on-light L3 from the top side 16 of the second prism 13 to the surface F2 is just as long as the glass path of the on-light L3 reflected at the mirror surface F4 from the surface F2 to the top side 17 of the fourth prism 15.

The second lens 9 is embodied in the form of an off-axis section of a lens with a first and second spherical interface, wherein the surface F3 is a section of the first spherical interface having a radius of curvature of −509.82 mm and the surface F4 is a section of the second spherical interface having a radius of curvature of −455.99 mm. The two spherical interfaces are spaced apart from one another in the axial direction by 16.5 mm. The axial direction is here the z-direction of the local coordinate system of the surface F2 before its rotation through 22.4°. The axial distance of the local coordinate origins of the surfaces F2 and F3 is 265.22 mm. The two tilting mirror matrices 3, 5 each have a glass cover (NBK7) with a thickness of 3.0 mm, which is arranged at a distance of around 0.48 mm from the midpoints of the tilting mirrors and by 0.1 mm from the corresponding top side 16, 17 of the second or fourth prism 13, 15.

For the prisms 12 and 14, again NBK7 from SCHOTT AG is used, and for the prisms 13 and 15, SLAH66 from OHARA GmbH, Im Langgewann 4, 65719 Hofheim am Taunus, Germany is used with an Abbe number of 49.6 and a refractive index of 1.77250 at the d-line (587 nm) and an Abbe number of 49.4 and a refractive index of 1.77621 at the e-line (546 nm). For the two lenses 8 and 9, NFK5 from SCHOTT AG is used with an Abbe number of 70.4 and a refractive index of 1.48749 at the d-line (587 nm) and an Abbe number of 70.2 and a refractive index of 1.48914 at the e-line (546 nm).

In the same way as table 2, table 4 below shows the distortion (deviation of the chief ray intersection points of a beam coming from the first tilting mirror matrix 3 from the midpoint of the respectively assigned pixel of the second tilting mirror matrix 5 in the plane thereof) for a grid of 5×5 field points distributed regularly over the surface of the first tilting mirror matrix 3.

TABLE 4

| x-Coordinate of the field point in mm | y-Coordinate of the field point in mm | x-Distortion in μm | y-Distortion in μm | Field point No. |
|---|---|---|---|---|
| 28.838 | 16.758 | −1.9302 | −0.628528 | 1 |
| 34.318 | 11.278 | −1.44137 | 1.88297 | 2 |
| 39.798 | 5.798 | 1.08306 | 1.16644 | 3 |
| 45.278 | 0.318 | 2.68963 | −0.371421 | 4 |
| 50.758 | −5.162 | 0.578919 | −4.03278 | 5 |
| 25.939 | 13.859 | −1.81299 | −0.863106 | 6 |
| 31.419 | 8.379 | −1.26539 | 1.77738 | 7 |
| 36.899 | 2.899 | 0.606691 | 1.88743 | 8 |
| 42.379 | −2.581 | 1.22142 | 1.37751 | 9 |
| 47.859 | −8.061 | −1.46101 | −1.66907 | 10 |
| 23.04 | 10.96 | −1.2331 | −1.29975 | 11 |
| 28.52 | 5.48 | −0.494738 | 1.19751 | 12 |
| 34.00 | 0.00 | 0.928817 | 1.83591 | 13 |
| 39.48 | −5.48 | 0.842039 | 2.04334 | 14 |
| 44.96 | −10.96 | −2.11586 | −0.361775 | 15 |
| 20.141 | 8.061 | −0.487519 | −1.99245 | 16 |
| 25.621 | 2.581 | 0.48282 | 0.114233 | 17 |
| 31.101 | −2.899 | 1.597 | 0.993166 | 18 |
| 36.581 | −8.379 | 1.01871 | 1.70299 | 19 |
| 42.061 | −13.859 | −2.04069 | 0.122957 | 20 |
| 17.242 | 5.162 | 0.232847 | −2.9648 | 21 |
| 22.722 | −0.318 | 1.40446 | −1.48589 | 22 |
| 28.202 | −5.798 | 2.26108 | −0.658525 | 23 |
| 33.682 | −11.278 | 1.27073 | 0.387934 | 24 |
| 39.162 | −16.758 | −1.89547 | −0.152872 | 25 |

Figure 13:
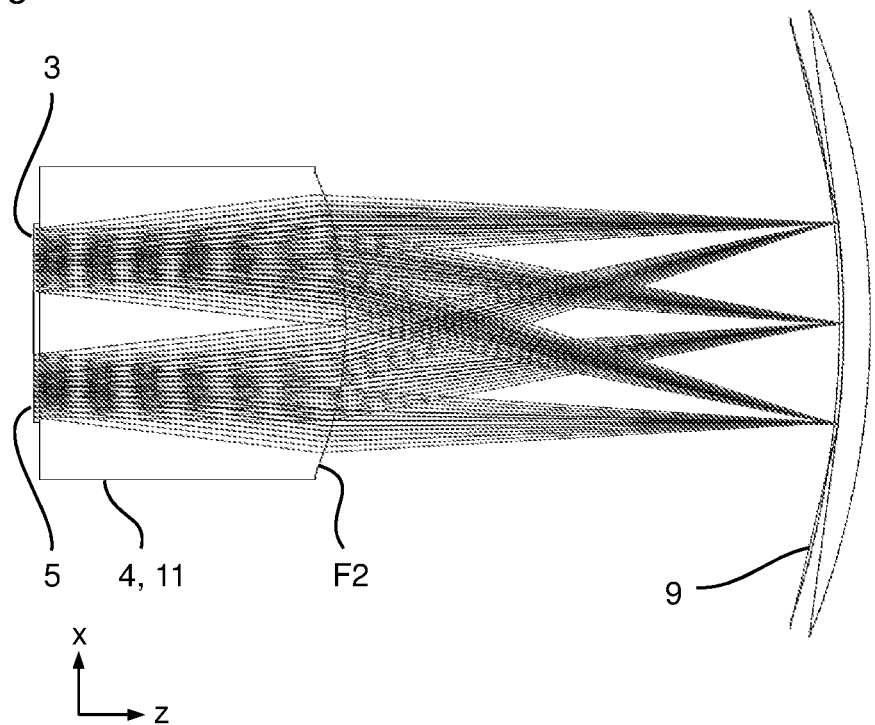
FIG. 13 shows the ray profiles of the unfolded beam path of the second exemplary embodiment in the xz section.
Figure 14:
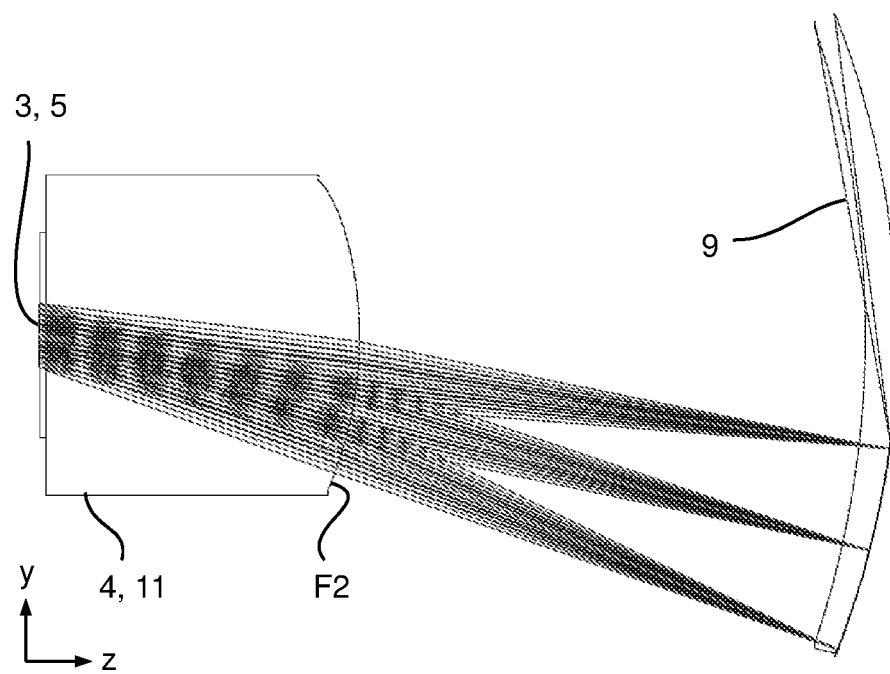
FIG. 14 shows the ray profiles of the unfolded beam path of the second exemplary embodiment in the yx section.
Figure 15:
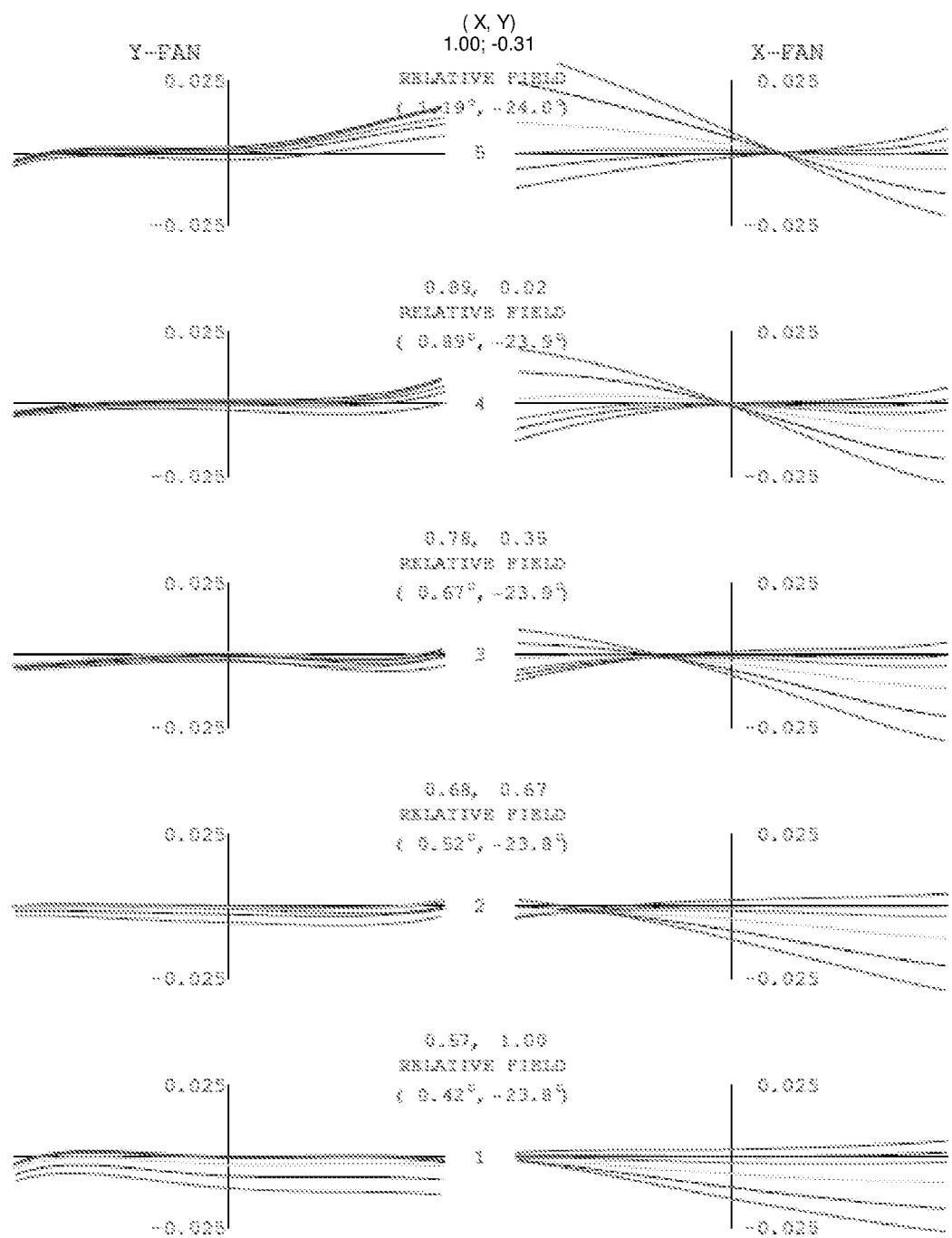
FIGS. 15-19 show transverse aberration curves in the xz section (left column) and in the yz section (right column) for 25 different field beams.
Figure 16:
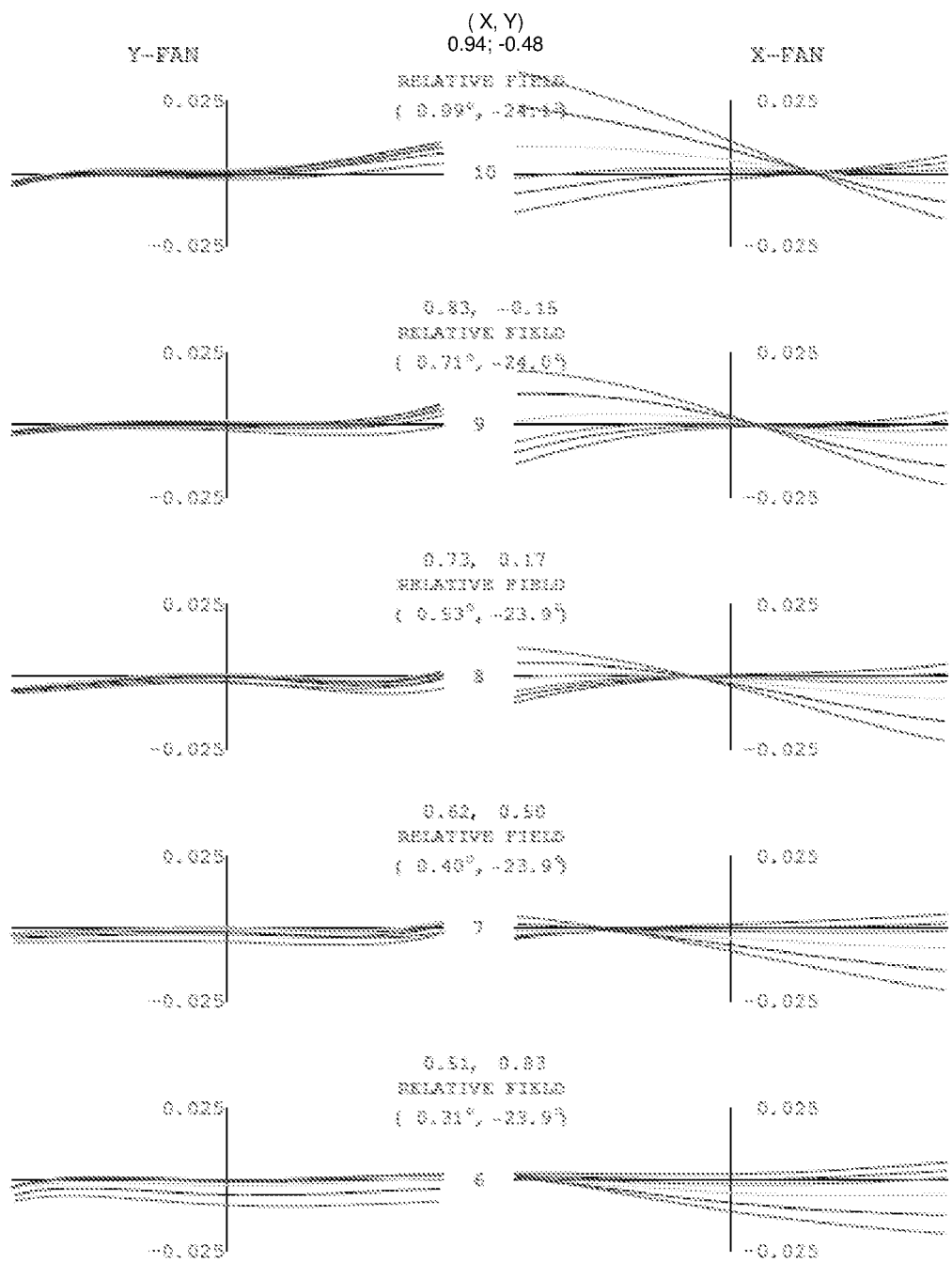
Figure 17:
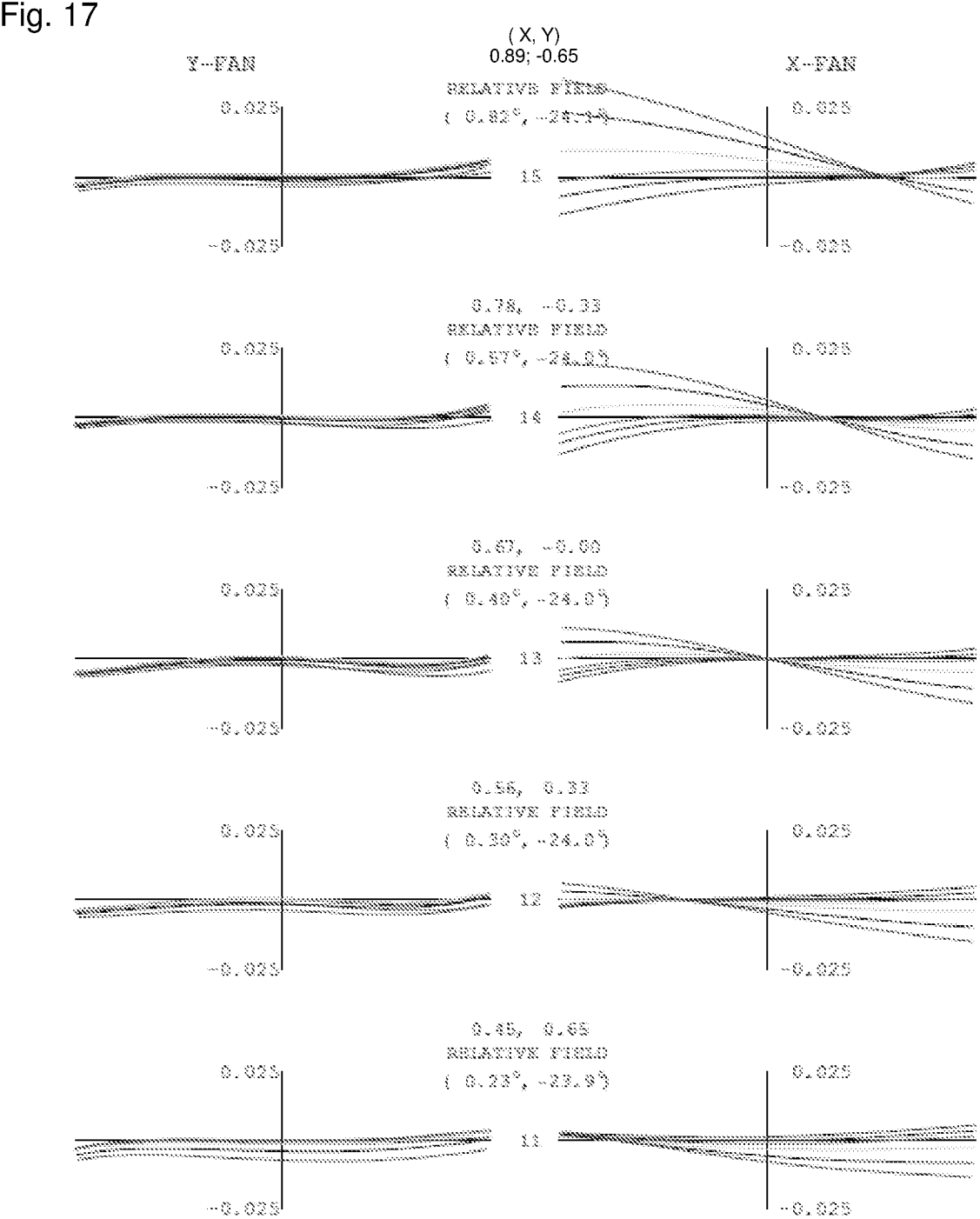
Figure 18:
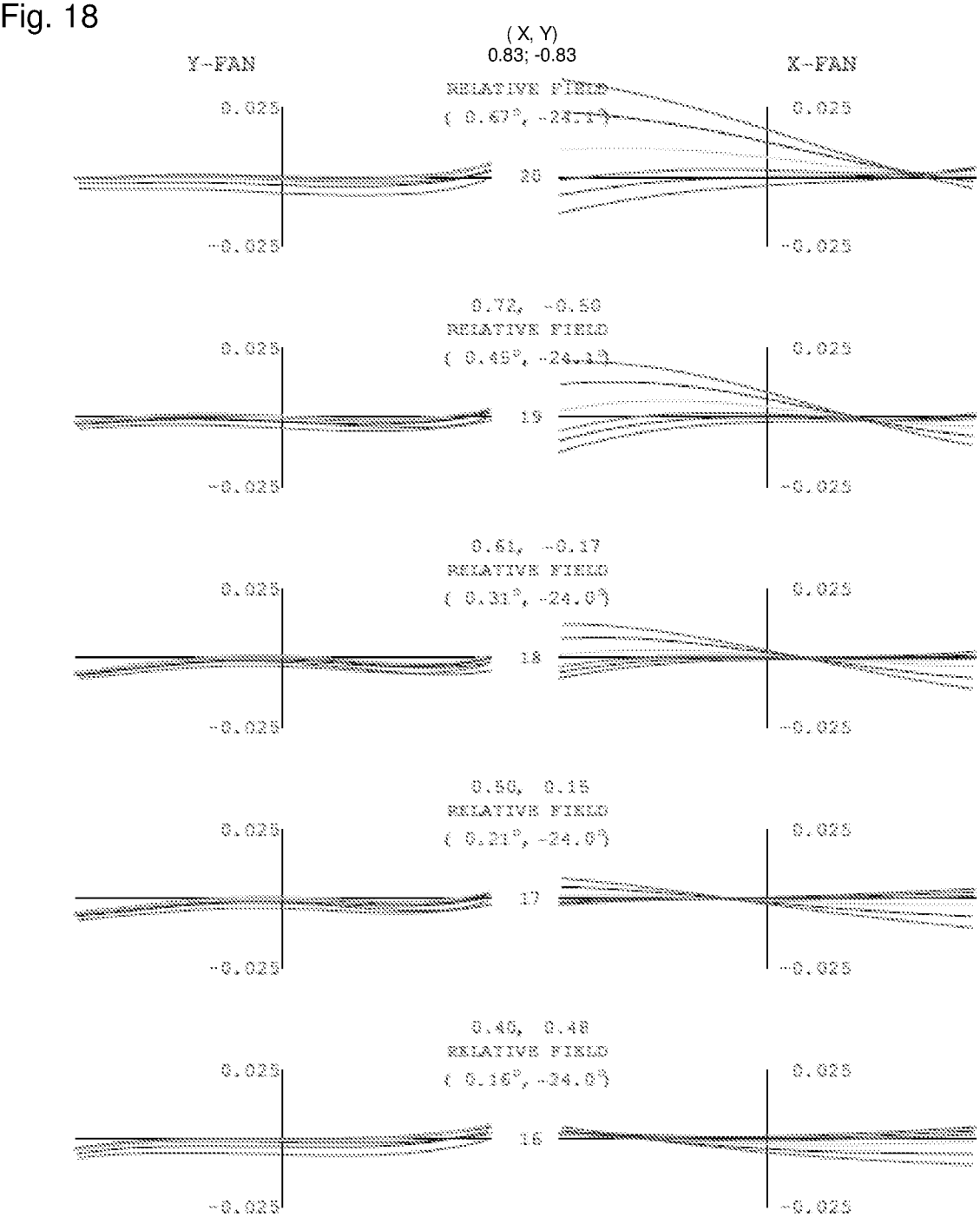
Figure 19:
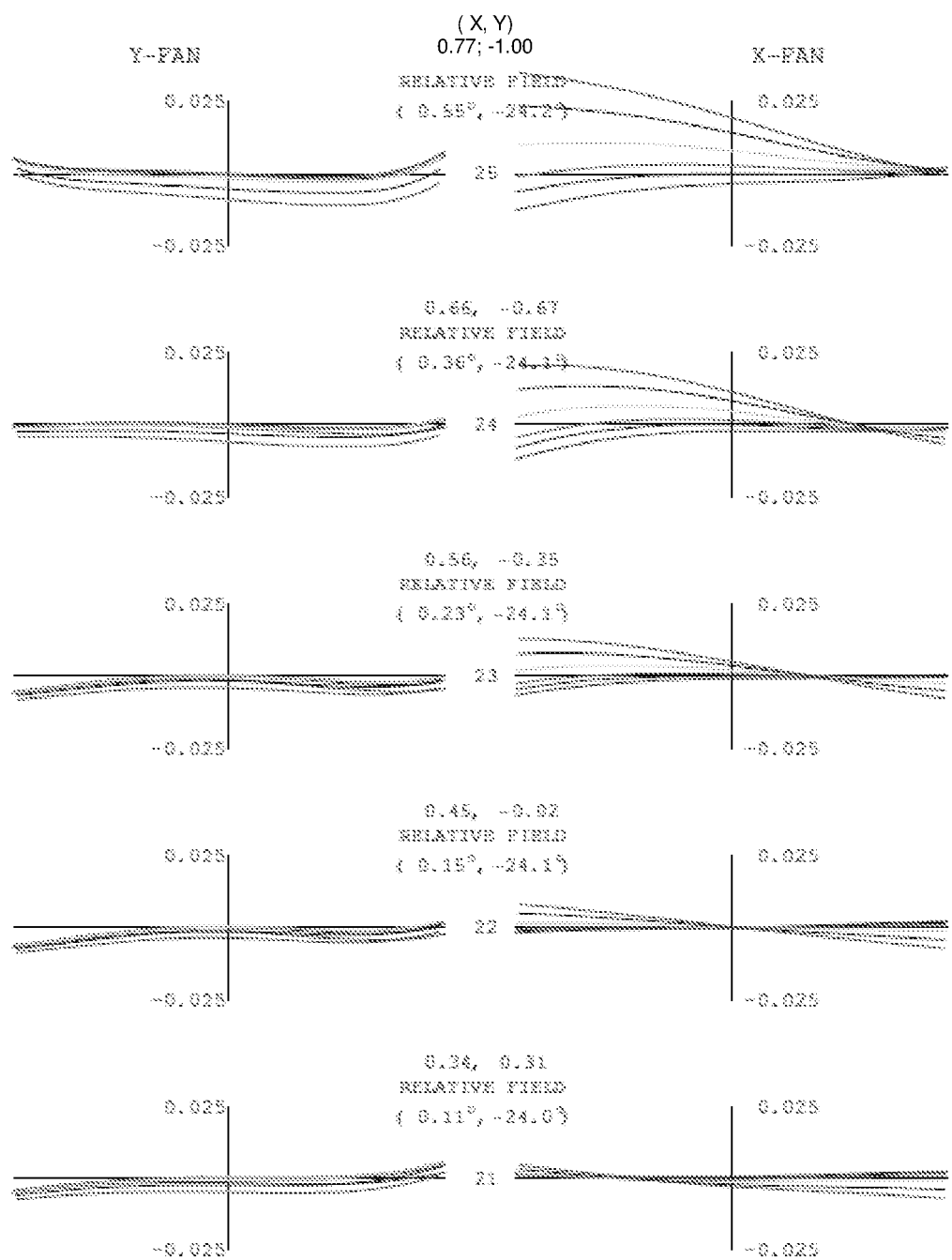

FIG. 13 shows the ray profiles of the unfolded beam path in the xz-section, and FIG. 14 shows the ray profiles of the unfolded beam path in the yz-section.

The following FIGS. 15 to 19 show, similarly to FIGS. 8 to 12, the imaging quality on the basis of the transverse aberration curves in the yz-section and xz-section for the field beams which belong to the same field beams from table 4 which are distributed 5×5 equidistantly over the image field, but curves for the wavelength of 1050 nm are not included here.

A non-meridionally symmetric intermediate imaging optical unit according to the invention images a first tilting mirror matrix 3 onto a second tilting mirror matrix 5 with the imaging scale 1:1. The midpoints of the tilting mirrors of the first tilting mirror matrix 3 form the object plane or reference plane E, which, when viewing the unfolded deflection optical unit 11, coincides with the xy-plane of the coordinate system, as is shown in FIGS. 6, 7, 13 and 14. The individual tilting mirrors of the first tilting mirror matrix 3 can thus be uniquely denoted with the x- and y-coordinates of their respective midpoints (cf. tables 2 and 4 above).

The plane formed by the tilting mirror midpoints of the second tilting mirror matrix 5 can, in the most general case, be tilted about a (small) angle (for example of up to approximately ±1°) with respect to the reference plane E. Such a tilt can be, in particular in connection with a non-meridionally symmetric intermediate imaging optical unit 4, a further degree of freedom that can be used for calibrating the distortion. However, to simplify mounting and adjustment, the exemplary embodiments described are designed such that the second tilting mirror matrix 5 also lies in the reference plane E.

The "primary axis" denotes the z-axis of the right-handed Cartesian coordinate system, which can also be understood to be the mid-perpendicular on the reference plane E in the point U (U=coordinate origin), which splits the straight connecting line 31 (drawn in dashes in FIG. 4) between the midpoint of the modulator surface of the first tilting mirror matrix 3 and the midpoint of its image that is imaged by the intermediate imaging optical unit 4 into portions of equal length. Here, too, an unfolded deflection optical unit 11, as is shown in FIGS. 6, 7, 13 and 14, is assumed. The coordinate origin U is drawn only in FIG. 4 to simplify the illustrations. In all other figures, only the corresponding x-, y- and/or z-direction is shown.

As a measure for when the intermediate imaging optical unit 4 can still be called compact for given requirements, the "field angle load" FWB is defined as the ratio of the "half field diameter" D2 to the "structural length" B. The distortion increases to a high power (at least to the fifth power) with the parameter FWB.

A "half field diameter" D2 of the intermediate imaging optical unit 4 shall denote the half diameter of the smallest circle 31 (shown in dashes in FIG. 4) about the coordinate origin U in the reference plane E, which encloses all object points of the first tilting mirror matrix 3 (or the complete first modulator surface) and the entire image of the first modulator surface that is imaged by the intermediate imaging optical unit 4 (and consequently, except for the effect of the distortion, also of the second tilting mirror matrix 5).

The "structural length" B of the intermediate imaging optical unit 4 shall denote the extent (along the z-direction, that is to say the direction of the primary axis) of the smallest cuboid 32 (shown in dashes in FIG. 4) that completely encloses the optically used regions of all optical elements between the tilting mirror matrices 3, 5 and including the tilting mirror matrices 3, 5.

Experience has shown that the field angle load is a highly critical parameter for the residual distortion of the intermediate imaging optical unit 4. For a field angle load FWB of 0.08, it is also possible to achieve substantially pixel-accurate imaging, and with a field angle load FWB of less than 0.06, it is also possible to achieve highly pixel-accurate imaging, with a meridionally symmetric intermediate imaging optical unit. In this case, we consider imaging to be substantially pixel-accurate if the distortion in every direction (x/y) is smaller than the edge length of a tilting mirror of the tilting mirror matrix, and is highly pixel-accurate if it is smaller than half (in particular even ⅓ of) the edge length of a tilting mirror of the tilting mirror matrix.

The non-meridionally symmetric intermediate imaging optical unit 4 according to the invention is advantageous if a field angle load FWB≥0.06, and particularly advantageous if FWB≥0.08. In that case, it reduces the residual distortion that is achievable in each case. Moreover, to a minor extent it also supports the finer correction of the residual wavefront errors, that is to say the sharpness of the imaging.

For field angle loads FWB≥0.1, substantially pixel-accurate imaging can be achieved only with the non-meridionally symmetric free-form optical unit according to the invention.

In the first exemplary embodiment 1, the half field diameter is 51.02 mm and the structural length is 493.9 mm. This gives a field angle load of FWB=0.1033.

In the second exemplary embodiment 2, the half field diameter is likewise 51.02 mm and the structural length is 445.6 mm. This gives a field angle load of FWB=0.1145.

It is possible to view the maximum deviation of the surface profile of the free-form surface F2 along the z-coordinate ("sag") over the entire region that is optically used by light beams for respectively mirrored values of the x-coordinate as a characteristic measure for characterizing the deviation of the free-form surfaces F2 from the meridional symmetry, "Deviation from the meridional symmetry" AvMS at a point having the coordinates x, y in the local surface coordinate system of the free-form surface F2 is understood to mean the absolute value of the difference of the sags $AvMS(x,y):=|z(+x,y)-z(-x,y)|$. Accordingly, the value of AvMS(x,y) that is greatest in terms of absolute value for all points x,y belonging to the optically used region of the free-form surface is defined as the "maximum deviation from the meridional symmetry" MaxAvMS.

A typical value range of the deviation of the free-form surface from the meridional symmetry is 1 μm MaxAvMS 100 μm, wherein the value range is preferably 3 μm≤MaxAvMS≤20 μm.

For the first exemplary embodiment, this gives a maximum deviation from the meridional symmetry of approximately MaxAvMS=8.5 μm, and for the second exemplary embodiment, this gives a maximum deviation from the meridional symmetry of approximately MaxAvMS=4 μm.

Although the sagittal sectional image according to FIGS. 6 and 13 might easily lead one to assume a symmetry of the problem, this is exactly not the case according to the invention. Intuition might suggest that, in the case of a meridionally symmetric intermediate imaging optical unit (for example an even rotationally symmetric intermediate imaging optical unit), a point having the x-coordinate of e.g. +10 mm is imaged exactly onto the mirrored point having the coordinate −10 mm. However, due to the distortion, this is not (exactly) the case, in particular for object points that have a non-zero coordinate with respect to the selected coordinate system even along the y-axis. Rather, it is exactly the break in meridional symmetry that surprisingly helps in approaching the ideal of a symmetric position of the object and image points, that is to say to minimize the residual distortion. The latter tends to increase significantly if the midpoints of the tilting mirror matrices move further away from the primary axis of the intermediate imaging optical unit 4. A non-meridionally symmetric design of the intermediate imaging optical unit is essential for allowing this distortion to be corrected well again while still maintaining a compact structural form.

It is thus preferred that the intermediate imaging optical unit 4 consists of an off-axis section of a glass lens 9 that has been made reflective on its rear side and has spherical interfaces F3, F4 and of a planoconvex lens 8, whose convex surface F2 is embodied as a non-meridionally symmetric free-form surface F2 for the effective correction of the distortion of specific wavefront aberrations.

The extents of the surfaces of the lenses 8 and 9 and of the prisms 12-15 are based on the specified dimensions of the image field, the numerical aperture, and the construction data of the optical elements in a manner such that no artificial vignetting occurs in the intermediate imaging optical unit 4. The effective aperture stop is formed by the extent of the surface F4, which has been made reflective.

The aperture stop of the intermediate imaging optical unit 4 is formed by the optically used region of the mirror surface F4 of the second lens 9.

To supplement the above explanations as to why the mirror symmetry in the arrangement of the tilting mirror matrices is broken in the exemplary embodiments shown, the following will be noted.

What is essential is that the distribution of the tilting mirrors of the tilting mirror matrices 3, 5 is not mirror-symmetric with respect to the yz-plane in the illustrations according to FIGS. 6, 7 and FIGS. 13, 14. Rather, they are point-symmetric with respect to the coordinate origin. However, a fictitious mirror symmetry with respect to the xz-plane is also broken by the aperture stop being decentered in the direction of the y-axis. Consequently, both fictitious mirror symmetries that could be presumed with respect to these planes are no longer present. The deviation from the meridional symmetry according to the invention in the case of the free-form surface F2 therefore results in the described optical advantages of the intermediate imaging optical unit 4.

In the above description, it was assumed that the illumination modulator 3 is irradiated with white light. However, it is also possible that the light source 2 emits colored light. In particular, it can emit light of time-sequentially differing colors, such as red, green and blue light. It is then possible in the manner that is known to a person skilled in the art to generate a multicolored image through the time-sequential representation of red, green and blue partial color images. The color change merely needs to be performed so fast that a viewer can no longer separate between the partial color images that are projected in temporal succession, so that the viewer will only perceive the superposition and thus the multicolored image.

The time-sequential generation of the differently colored illumination light can be performed in the usual way, for example by means of a color wheel (not shown) between the light source 2 and the illumination modulator 3.

It is of course also possible, rather than providing only one illumination modulator, to provide three illumination modulators 3, which are irradiated simultaneously with red, green or blue light. The red, green and blue on-light of the three modulators is then superposed, and the superposed on-light is imaged color-selectively onto three image modulators 5 by means of the intermediate imaging optical unit 4. The image modulators modulate the respective color partial image, which is in turn superposed and then projected onto the projection surface 10 by means of the intermediate imaging optical unit 6.

The superposition and color separation can be performed by means of dichroic layers. This embodiment with six modulators is of course significantly more complex than the described embodiment in connection with FIGS. 1 to 5. However, it is possible to produce a brighter color image with such an embodiment.

What is claimed is:

1. A projection system, comprising:
    a first modulator comprising a plurality of pixels in a first modulator surface;
    a second modulator comprising a plurality of pixels in a second modulator surface; and
    an intermediate imaging optical unit, which images the first modulator surface onto the second modulator surface,
    wherein the intermediate imaging optical unit comprises a first lens having a convex side, and
    wherein the convex side of the first lens comprises a free-form surface, which is not spherical and not rotationally symmetric and does not exhibit any mirror symmetry.

2. The projection system of claim 1, wherein the intermediate image optical unit is configured such that a ratio of half a diameter of an imaginary smallest circle surrounding a complete first modulator surface and an entire image of the first modulator surface that is imaged by the intermediate imaging optical unit to a maximum extent of an imaginary smallest cuboid enclosing optically used regions of all the optical elements between the two modulators, is ≥0.06 and ≤0.25.

3. The projection system of claim 1, wherein the first and second modulator surfaces in each case occupy a rectangular surface of at least 31 mm×16.4 mm.

4. The projection system of claim 1, wherein a maximum extent of an imaginary smallest cuboid enclosing optically used regions of all the optical elements between the two modulators and the two modulators is smaller than or equal to 500 mm.

5. The projection system of claim 1, wherein the first modulator surface lies in a first plane and the second modulator surface lies in a second plane, and the first and second planes are tilted relative to one another by an angle that is smaller than or equal to 2°.

6. The projection system of claim 1, wherein the first lens comprises a planoconvex lens.

7. The projection system of claim 1, wherein a deflection optical unit, which folds the beam path between the intermediate imaging optical unit and the respective modulator at least once, is arranged between the modulators on a first side and the intermediate imaging optical unit on a second side that is opposite the first side.

8. The projection system of claim 1, wherein the two modulators each comprise a tilting mirror matrix.

9. The projection system of claim 8,
    wherein the tilting mirrors are switchable in each case into a first and a second tilted position,
    wherein the projection further comprises an illumination module, which illuminates the first tilting mirror matrix with light in a manner such that light impingement is perpendicular to the modulator surface of the first tilting mirror matrix, and
    wherein the intermediate imaging optical unit images the light, which is reflected by the tilting mirrors of the first tilting mirror matrix that are in the first tilted position, onto the second tilting mirror matrix at such an angle that the light reflected by the tilting mirrors of the second tilting mirror matrix that are in the first tilted position travels perpendicularly to the modulator surface of the second tilting mirror matrix.

10. The projection system of claim 1,
    wherein an x-axis of a right-handed Cartesian coordinate system coincides with an imaginary straight connecting line connecting a midpoint of the first modulator surface and a midpoint of an image of the first modulator surface that is imaged by the intermediate imaging optical unit, wherein a z-axis is located in an unfolded state of any planar reflection surfaces of all the optical elements between the modulators perpendicularly to a reference plane in which the first modulator surface is located, and splits the imaginary straight connecting line as a mid-perpendicular into two portions of equal length, and wherein the two modulator surfaces are rectangular surfaces and are arranged, in the unfolded state of any planar reflection surfaces of all the optical elements between the modulators in an x-y-plane in each case such that one side of a rectangular modulator surface encloses with a y-axis an angle in the range from 10° to 45°.

11. A projection system, comprising:

a first modulator comprising a plurality of pixels in a first modulator surface;

a second modulator comprising a plurality of pixels in a second modulator surface; and an intermediate imaging optical unit, which images the first modulator surface onto the second modulator surface, wherein the intermediate imaging optical unit comprises a first lens having a convex side, wherein the convex side of the first lens comprises a free-form surface, which is not spherical and not rotationally symmetric and does not exhibit any mirror symmetry, and wherein the intermediate imaging optical unit comprises a 1:1 imaging optical unit comprising a distortion correction, in which a remaining distortion error is smaller than 5 µm.

12. The projection system of claim 11, wherein the first and second modulator surfaces in each case occupy a rectangular surface of at least 31 mm×16.4 mm.

13. The projection system of claim 11, wherein the first lens comprises a planoconvex lens.

14. The projection system of claim 11, wherein the two modulators each comprise a tilting mirror matrix.

15. A projection system, comprising:

a first modulator comprising a plurality of pixels in a first modulator surface;

a second modulator comprising a plurality of pixels in a second modulator surface; and an intermediate imaging optical unit, which images the first modulator surface onto the second modulator surface, wherein the intermediate imaging optical unit comprises a first lens having a convex side, wherein the convex side of the first lens comprises a free-form surface, which is not spherical and not rotationally symmetric and does not exhibit any mirror symmetry, wherein an x-axis of a right-handed Cartesian coordinate system coincides with an imaginary straight connecting line that connects a midpoint of the first modulator surface and a midpoint of the image of the first modulator surface that is imaged by the intermediate imaging optical unit, wherein a z-axis is located in the unfolded state of any planar reflection surfaces of all the optical elements between the modulators perpendicularly to a reference plane in which the first modulator surface is located, and splits the imaginary straight connecting line as a mid-perpendicular into two portions of equal length, wherein a deviation of the convex side of the first lens from a mirror-symmetric embodiment with respect to a y-z-plane of the right-handed Cartesian coordinate system is defined as a maximum value of the respective absolute value of differences of a z-value of the convex side of in each case two points on the convex side of the first lens that are located symmetrically with respect to the y-z-plane, and wherein the deviation of the convex side of the first lens from a mirror-symmetric embodiment with respect to the y-z-plane of the right-handed Cartesian coordinate system is configured such that the maximum value is greater than or equal to 1 µm and smaller than or equal to 100 µm.

16. The projection system of claim 15, wherein the deviation of the convex side of the first lens from a mirror-symmetric embodiment with respect to the y-z-plane of the right-handed Cartesian coordinate system is designed such that the maximum value is ≥3 µm and ≤20 µm.

17. The projection system of claim 15, wherein the first and second modulator surfaces in each case occupy a rectangular surface of at least 31 mm×16.4 mm.

18. The projection system of claim 15, wherein the first lens comprises a planoconvex lens.

19. The projection system of claim 15, wherein the two modulators each comprise a tilting mirror matrix.

* * * * *